(12) United States Patent
Stevenson et al.

(10) Patent No.: US 8,662,408 B2
(45) Date of Patent: Mar. 4, 2014

(54) ANNULAR INJECTOR ASSEMBLY AND METHODS OF ASSEMBLING THE SAME

(75) Inventors: John Saunders Stevenson, Yorba Linda, CA (US); Robert Michael Zirin, Niskayuna, NY (US); Raymond Douglas Steele, Houston, TX (US); Constantin Bugescu, La Habra Heights, CA (US); Roger Ma, Chino Hills, CA (US); David R. Matthews, Simi Valley, CA (US); Kenneth M. Sprouse, Northridge, CA (US)

(73) Assignee: General Electric Company, Schenectady, NY (US)

( * ) Notice: Subject to any disclaimer, the term of this patent is extended or adjusted under 35 U.S.C. 154(b) by 771 days.

(21) Appl. No.: 12/854,736

(22) Filed: Aug. 11, 2010

(65) Prior Publication Data

US 2012/0037732 A1   Feb. 16, 2012

(51) Int. Cl.
*B05B 17/00* (2006.01)
(52) U.S. Cl.
USPC .............................. 239/1; 239/589; 239/600
(58) Field of Classification Search
USPC .......... 239/548, 558, 559, 550, 600, 1, 416.4, 239/416.5, 589; 285/377, 396, 401, 402
See application file for complete search history.

(56) References Cited

U.S. PATENT DOCUMENTS

| | | | |
|---|---|---|---|
| 4,618,323 A | 10/1986 | Mansour | |
| 4,685,404 A | 8/1987 | Sheppard et al. | |
| 5,000,580 A | 3/1991 | Leininger et al. | |
| 5,111,858 A * | 5/1992 | Aittama et al. | 141/312 |
| 5,643,394 A | 7/1997 | Maydan et al. | |
| 5,813,846 A | 9/1998 | Newby et al. | |
| 5,823,122 A | 10/1998 | Chronowski et al. | |
| 5,947,716 A | 9/1999 | Bellamy et al. | |
| 6,053,632 A | 4/2000 | Leininger | |
| 6,609,905 B2 | 8/2003 | Eroglu et al. | |
| 6,679,049 B2 | 1/2004 | Kline et al. | |
| 6,807,804 B2 | 10/2004 | Kline et al. | |
| 6,820,412 B2 | 11/2004 | Kline et al. | |
| 2004/0067461 A1 | 4/2004 | Ranke et al. | |
| 2006/0147853 A1 | 7/2006 | Lipp et al. | |
| 2006/0242907 A1 | 11/2006 | Sprouse et al. | |
| 2008/0236165 A1 * | 10/2008 | Baudoin et al. | 60/746 |
| 2010/0170253 A1 | 7/2010 | Berry et al. | |
| 2010/0294858 A1 * | 11/2010 | Steinhaus et al. | 239/418 |

OTHER PUBLICATIONS

FCCU Feed Injector Cold Flow Modeling 90EN194/91017, Texaco CE&P Engineering Division, 5 pages.
3 Stream Injector Cold Flow Modeling Results, ChevronTexaco, Feb. 12, 2004, 5 pages.
Duane Brooker, et al., Feed Injector Nozzle Scale-Up Testing: Bete Fog Nozzle Inc., Apr. 4-16, 1994, 73 pages.
National Aeronautics and Space Adminstration, Liquid Rocket Engine Injectors, NASA Space Vehicle Design Criteria (Chemical Propulsion), Mar. 1976, 131 pages, NASA SP-8089, National Technical Information Services, Springfield, Virginia.

* cited by examiner

*Primary Examiner* — Davis Hwu
(74) *Attorney, Agent, or Firm* — Armstrong Teasdale LLP

(57) ABSTRACT

An annular injector is described. The injector includes a first bayonet assembly and a second bayonet assembly each including a terminal end and a tip end. The second bayonet assembly is configured to be concentrically coupled at least partially about the first bayonet assembly. An outer diameter of the first bayonet assembly and an inner diameter of the second bayonet assembly vary at the tip end to define a first substantially annular nozzle. The first bayonet assembly includes a maximum outer diameter that is greater than a minimum inner diameter of the second bayonet assembly and at least a portion of at least one of the first bayonet assembly and the second bayonet assembly extends from the tip end to the terminal end. The injector includes a third bayonet assembly configured to be concentrically coupled at least partially about the second bayonet assembly to define a second substantially annular nozzle.

9 Claims, 18 Drawing Sheets

ANNULAR INJECTOR ASSEMBLY AND METHODS OF ASSEMBLING THE SAME

BACKGROUND OF THE INVENTION

The present invention relates generally to reaction chambers, such as a reaction chamber included in a gasification system used in an integrated gasification combined-cycle (IGCC) power generation plant, and more particularly, to injection devices used with gasification systems.

Many known IGCC plants include a gasification system that is integrated with at least one power-producing turbine system. For example, at least some known gasification systems convert a mixture of fuel, air or oxygen, steam, and/or $CO_2$ into a synthetic gas, or "syngas." The syngas is channeled to the combustor of a gas turbine engine, which powers an electrical generator that supplies electrical power to a power grid. Exhaust from at least some known gas turbine engines is supplied to a heat recovery steam generator (HRSG) that generates steam for driving a steam turbine. Power generated by the steam turbine also drives an electrical generator that provides electrical power to the power grid.

At least some known gasification systems include an injection system that supplies a gasification reactor with process fluids to facilitate at least one exothermic reaction. The injection system may include a plurality of concentric bayonets that, in combination, form a plurality of channels that each supplies the gasification reactor with a process fluid. However current bayonet designs may be limited because of assembly and/or maintenance concerns.

BRIEF DESCRIPTION OF THE INVENTION

In one aspect, a method of assembling an annular injector that includes a plurality of substantially annular nozzles is provided. The method includes providing a first bayonet assembly and a second bayonet assembly that each include a tip end and a terminal end. An outer diameter of the first bayonet assembly and an inner diameter of the second bayonet assembly vary at the tip end to define a first substantially annular nozzle therebetween. The method also includes configuring the first bayonet assembly for positioning within the second bayonet assembly, wherein a maximum outer diameter of the first bayonet assembly is greater than a minimum inner diameter of the second bayonet assembly and at least a portion of at least one of the first bayonet assembly and the second bayonet assembly extends from the tip end to the terminal end.

In another aspect, an annular injector is provided. The annular injector includes a first bayonet assembly and a second bayonet assembly. The first bayonet assembly and the second bayonet assembly each include a terminal end and a tip end. The second bayonet assembly is configured to be concentrically coupled at least partially about the first bayonet assembly. An outer diameter of the first bayonet assembly and an inner diameter of the second bayonet assembly vary at the tip end to define a first substantially annular nozzle therebetween. The first bayonet assembly includes a maximum outer diameter that is greater than a minimum inner diameter of the second bayonet assembly and at least a portion of at least one of the first bayonet assembly and the second bayonet assembly extends from the tip end to the terminal end. The annular injector also includes a third bayonet assembly configured to be concentrically coupled at least partially about the second bayonet assembly to define a second substantially annular nozzle therebetween.

DETAILED DESCRIPTION OF THE INVENTION

Figure 1:
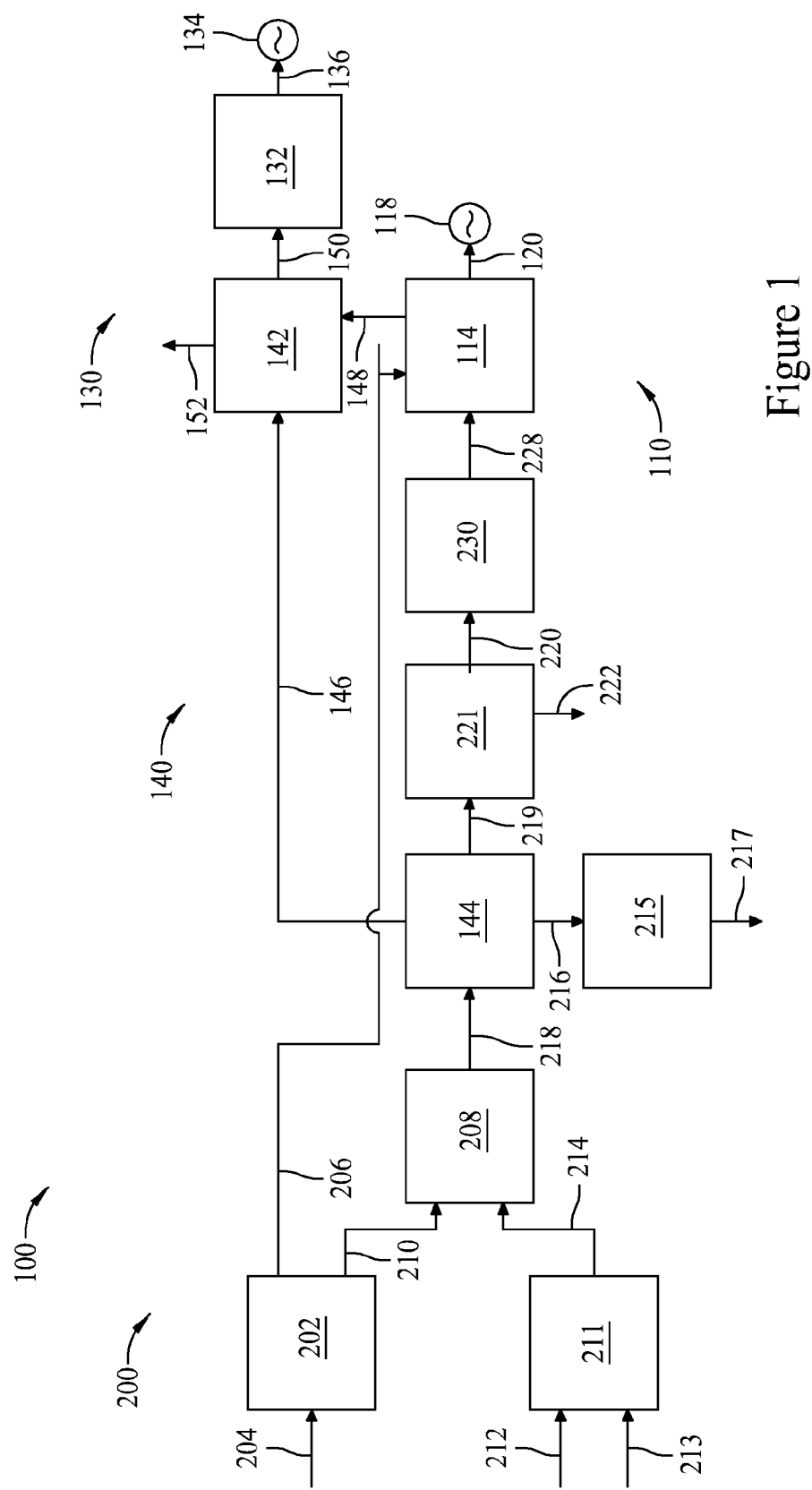
FIG. 1 is a schematic diagram of an exemplary integrated gasification combined-cycle (IGCC) power generation plant.

FIG. 1 is a schematic diagram of an exemplary gasification facility, specifically, an exemplary integrated gasification combined-cycle (IGCC) power generation plant 100. Alternatively, the method and apparatus to produce synthetic gas as described herein is used with any suitable gasification facility in any configuration that that enables such method and apparatus. In the exemplary embodiment, IGCC plant 100 includes a gas turbine engine 110. A turbine 114 is rotatably coupled to a first electrical generator 118 via a first rotor 120. Turbine 114 is coupled in flow communication with at least one fuel source and at least one air source (both described in more detail below) and is configured to receive the fuel and air from the fuel source and the air source (neither shown in FIG. 1), respectively. Turbine 114 mixes air and fuel, produces hot combustion gases (not shown), and converts the heat energy within the gases to rotational energy. The rotational energy is transmitted to generator 118 via rotor 120, wherein generator 118 converts the rotational energy to electrical energy (not shown) for transmission to at least one load, including, but not limited to, an electrical power grid (not shown).

IGCC plant 100 also includes a steam turbine engine 130. In the exemplary embodiment, engine 130 includes a steam turbine 132 rotatably coupled to a second electrical generator 134 via a second rotor 136.

IGCC plant 100 further includes a steam generation system 140. In the exemplary embodiment, steam generation system 140 includes at least one heat recovery steam generator (HRSG) 142 that receives exhaust gases (not shown) from turbine 114 via an exhaust gas conduit 148 that supplies heat used within HRSG 142 to produce one or more streams of steam from at least one boiler feedwater source that includes, but is not limited to, at least one heated boiler feedwater stream (not shown). HRSG 142 also is coupled in flow communication with at least one heat transfer apparatus 144 via at least one steam conduit 146. Heat transfer apparatus 144 is also coupled in flow communication with at least one heated boiler feedwater conduit (not shown), wherein heat transfer apparatus 144 receives heated boiler feedwater (not shown) from the same or a separate boiler feedwater source (not shown). HRSG 142 receives steam (not shown) from heat transfer apparatus 144 via steam conduit 146, wherein HRSG 142 facilitates addition of heat energy to the steam. HRSG 142 is coupled in flow communication with turbine 132 via a steam conduit 150. In the exemplary embodiment, the cooled combustion gases are exhausted from HRSG 142 to the atmosphere via stack gas conduit 152. Alternatively, at least a portion of the excess combustion gases from HRSG 142 are channeled for use elsewhere in IGCC plant 100.

Steam conduit 150 is configured to channel steam (not shown) from HRSG 142 to turbine 132. Turbine 132 is configured to receive the steam from HRSG 142 and convert the thermal energy in the steam to rotational energy. The rotational energy is transmitted to generator 134 via second rotor 136, wherein generator 134 is configured to facilitate converting the rotational energy to electrical energy (not shown) for transmission to at least one load, including, but not limited to, the electrical power grid. The steam is condensed and returned as boiler feedwater via a condensate conduit (not shown). Alternatively, at least a portion of the steam from HRSG 142, steam turbine 132 and/or heat transfer apparatus 144 is channeled for use elsewhere in IGCC plant 100.

IGCC plant 100 also includes a gasification system 200. In the exemplary embodiment, gasification system 200 includes at least one air separation unit 202 coupled in flow communication with an air source via an air conduit 204. The air sources include, but are not limited to, dedicated air compressors (not shown) and a compressor (not shown) typically associated with gas turbine engine 110. Air separation unit 202 is configured to separate air into one or more streams of oxygen ($O_2$), nitrogen ($N_2$), and other component streams (neither shown). The other component streams may be released via a vent (not shown) or collected in a storage unit (not shown). In the exemplary embodiment, at least a portion of $N_2$ is channeled to gas turbine 114 via a $N_2$ conduit to facilitate combustion.

Gasification system 200 includes a gasification reactor 208 that is coupled in flow communication with air separation unit 202 and is configured to receive the $O_2$ channeled from air separation unit 202 via an $O_2$ conduit 210. Gasification system 200 also includes a material grinding and slurrying unit 211. Unit 211 is coupled in flow communication with a carbonaceous material source and a water source (neither shown) via a carbonaceous material supply conduit 212 and a water supply conduit 213, respectively. In the exemplary embodiment, the carbonaceous material is petroleum coke, or pet coke. Moreover, in the exemplary embodiment, unit 211 is configured to mix the pet coke and water to form a pet coke slurry stream (not shown) that is channeled to gasification reactor 208 via a pet coke slurry conduit 214. Alternatively, any suitable material that includes carbonaceous solids is used that facilitates operation of IGCC plant 100 as described herein. Also, alternatively, non-slurry fuels that include solid, liquid, and/or gaseous fuel substances are used, including mixtures of fuels and other materials, such as but not limited to, fuel and slag additives.

Gasification reactor 208 is configured to receive the material slurry stream and an $O_2$ stream via conduits 214 and 210, respectively. Gasification reactor 208 is also configured to facilitate production of a hot, raw synthetic gas (syngas) stream (not shown). Moreover, gasification reactor 208 is also configured to produce hot slag and char (both not shown) as a by-product of the syngas production.

Gasification reactor 208 is coupled in flow communication with heat transfer apparatus 144 via a hot syngas conduit 218. Heat transfer apparatus 144 is configured to receive the hot, raw syngas stream and transfer at least a portion of the heat to HRSG 142 via steam conduit 146. Subsequently, heat transfer apparatus 144 produces a cooled, raw syngas stream (not shown) that is channeled to a scrubber and low temperature gas cooling (LTGC) unit 221 via a syngas conduit 219. LTGC unit 221 is configured to remove the portion of slag and char entrained within the raw syngas stream (sometimes referred to as "fines") and facilitate removal of the fines via a fines conduit 222. The fines are sent to a waste collection system (not shown) for ultimate disposal and/or recirculated back into gasification reactor 208 to take advantage of unused carbon content within the fines. LTGC unit 221 is also configured to further cool the raw syngas stream.

Heat transfer apparatus 144 also facilitates removal of slag and char from the hot, raw syngas stream. Specifically, a slag and char handling unit 215 is coupled in flow communication with heat transfer apparatus 144 via a hot slag conduit 216. Slag and char handling unit 215 is configured to quench the balance of the char and slag, simultaneously breaking up the slag into small pieces wherein a slag and char removal stream (not shown) is produced and channeled through conduit 217. In a manner similar to the fines discussed above, the slag and char are channeled to a waste collection subsystem (not shown) for ultimate disposal and/or recirculated back into gasification reactor 208 to take advantage of unused carbon within the slag and char.

Gasification system 200 further includes an acid gas removal subsystem 230 that is coupled in flow communication with LTGC unit 221 and is configured to receive the cooled raw syngas stream via a raw syngas conduit 220. Subsystem 230 is also configured to facilitate removal of at least a portion of acid components (not shown) from the raw syngas stream as discussed further below. Such acid gas components include, but are not limited to, $H_2S$ and $CO_2$. Subsystem 230 is further configured to facilitate separation of at least some of the acid gas components into components that include, but are not limited to, $H_2S$ and $CO_2$. In the exemplary embodiment, $CO_2$ is not recycled and/or sequestered. Alternatively, subsystem 230 is coupled in flow communication with gasification reactor 208 via at least one $CO_2$ conduit (not shown) wherein a stream of $CO_2$ (not shown) is channeled to predetermined portions of gasification reactor 208. The removal of such $CO_2$ and $H_2S$ via subsystem 230 facilitates producing a clean syngas stream (not shown) that is channeled to gas turbine 114 via a clean syngas conduit 228.

In operation, air separation unit 202 receives air via air conduit 204. The air is separated into $O_2$, $N_2$, and other components. The other components are vented or collected, wherein at least a portion of $N_2$ is channeled to turbine 114 via a conduit 206 and at least a portion of $O_2$ is channeled to gasification reactor 208 via conduit 210. Remaining portions of $N_2$ and $O_2$ may be channeled as a plurality of streams to other portions of IGCC plant 100 as needed, including, but not limited to, storage. Also, in operation, material grinding and slurrying unit 211 receives pet coke and water via conduits 212 and 213, respectively, forms a pet coke slurry stream and channels the pet coke slurry stream to gasification reactor 208 via conduit 214.

Gasification reactor 208 receives the $O_2$ via conduit 210, pet coke via conduit 214. Gasification reactor 208 facilitates production of a hot raw syngas stream that is channeled to heat transfer apparatus 144 via hot syngas conduit 218. Some of the slag by-product that is formed in gasification reactor 208 is removed via slag and char handling unit 215 and conduits 216 and 217. Heat transfer apparatus 144 facilitates cooling the hot raw syngas stream to produce a cooled raw syngas stream that is channeled to scrubber and LTGC unit 221 via syngas conduit 219 and the syngas is cooled further. Particulate matter, including some of the slag and char (in the form of fines), is removed from the syngas via fines conduit 222. The cool raw syngas stream is channeled to acid gas removal subsystem 230 wherein acid gas components are selectively removed such that a clean syngas stream is formed and channeled to gas turbine 114 via clean syngas conduit 228.

Further, in operation, turbine 114 receives $N_2$ and clean syngas via conduits 206 and 228, respectively. Turbine 114 compresses air from at least one air source (not shown) that turbine 114 subsequently mixes and combusts with the syngas fuel, producing hot combustion gases. Turbine 114 channels the hot combustion gases to induce rotation of turbine 114 which subsequently rotates first generator 118 via rotor 120. At least a portion of the exhaust gases are channeled to HRSG 142 from turbine 114 via exhaust gas conduit 148 to facilitate generating steam.

At least a portion of the heat removed from the hot syngas via heat transfer apparatus 144 is channeled to HRSG 142 as steam via steam conduit 146. HRSG 142 receives the steam from heat transfer apparatus 144, together with one or more streams of boiler feed water, as well as the exhaust gases from turbine 114. Heat is transferred from the exhaust gases to the one or more streams of boiler feedwater as well as the steam from heat transfer apparatus 144, thereby producing one or more subsequent streams of steam as well as increasing the heat energy contained in the steam from heat transfer apparatus 144. In the exemplary embodiment, at least one of the streams of steam generated as described above is heated to superheated conditions. Alternatively, one or more of the aforementioned streams of steam are mixed together to form one or more mixed streams that may be heated to superheated conditions. Alternatively, high temperature saturated steam is formed. At least a portion of the superheated steam is channeled to steam turbine 132 via steam conduit 150 and induces a rotation of turbine 132. Turbine 132 rotates second generator 134 via second rotor 136. A remaining portion of the steam is channeled for use elsewhere within IGCC plant 100.

Figure 2:
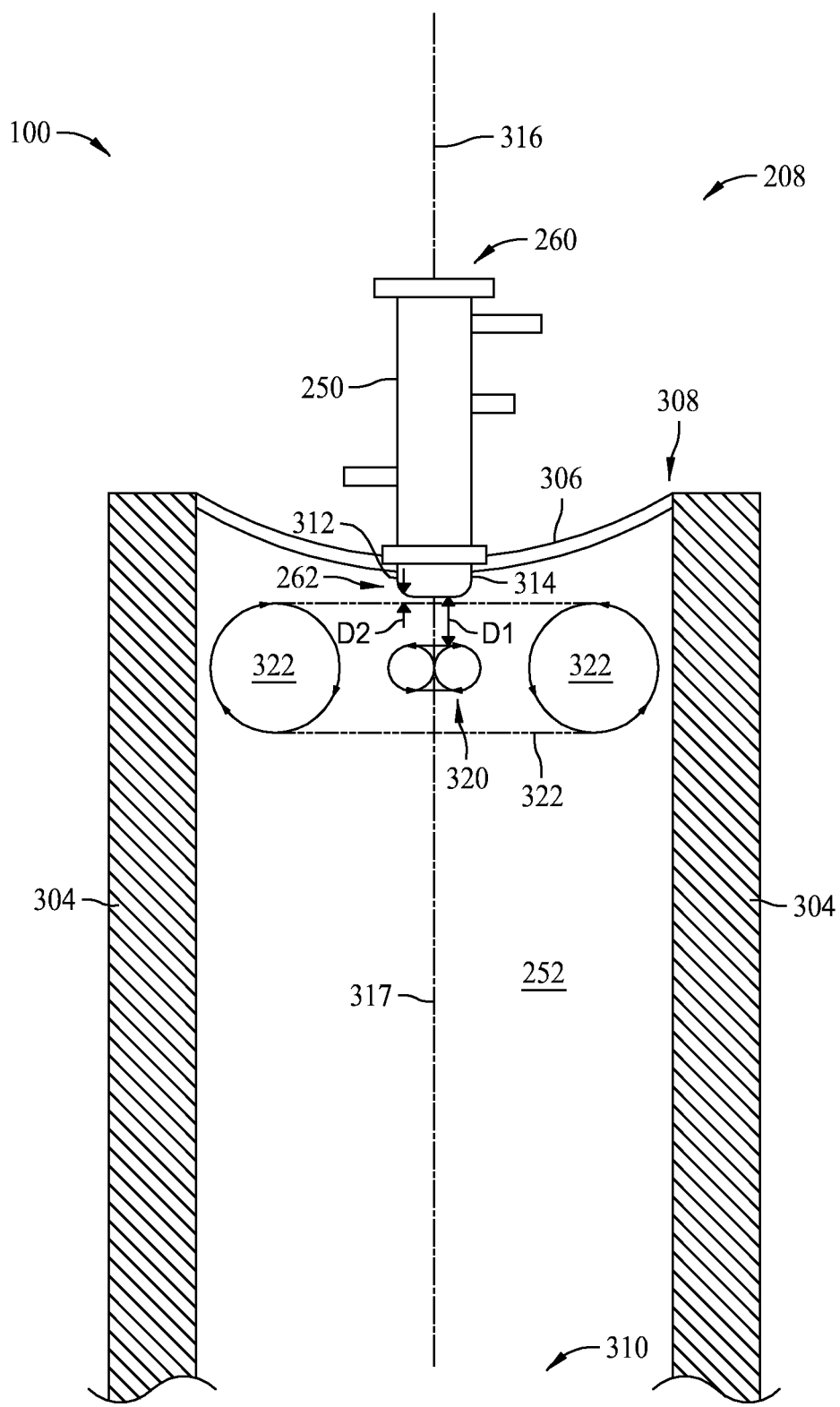
FIG. 2 is a schematic cross-sectional view of a gasification reactor that may be used for synthetic gas generation, such as may be used with the IGCC power generation plant shown in FIG. 1.

FIG. 2 is a schematic cross-sectional view of gasification reactor 208 that may be used for synthetic gas generation, such as may be used with IGCC power generation plant 100. Gasification reactor 208 includes at least one injection device 250 that is coupled in flow communication with a gasification cavity 252. In the exemplary embodiment, injection device 250 (also referred to herein as injector 250) is an annular triplet gasifier injector nozzle as described herein, thereby including three annular passages (described further below). Alternatively, injection device 250 is any suitable injector nozzle that includes, but is not limited to, configurations with four or more annular passages. Further, alternatively, injection device 250 is any suitable injector nozzle that includes, but is not limited to, three or more concentric passages, wherein each passage is coupled in flow communication with the annular passages described above in any configuration that facilitates operation of injection device 250 as described herein. Injection device 250 includes a terminal end 260 and a tip end 262.

Gasification cavity 252 is at least partially defined by a substantially cylindrical reactor wall 304 and a head end cover 306. In the exemplary embodiment, gasification reactor 208 is substantially cylindrical. Alternatively, gasification reactor 208 includes any configuration that facilitates operation of gasification reactor 208 as described herein. Also, in the exemplary embodiment, injection device 250 has a substantially vertical orientation (described further below) wherein injection device 250 penetrates the top of gasification reactor 208 and points substantially downward. Alternatively, injection device 250 has any orientation including, but not limited to, substantially horizontal orientations.

In the exemplary embodiment, reactor wall 304 includes at least one ceramic refractory material that includes, but is not limited to, heat tempered bricks. Alternatively, reactor wall 304 is fluid-cooled, wherein the cooling fluids include, but are not limited to, nitrogen, water, and/or steam. Head end cover 306 is sealingly coupled to at least a portion of a head end portion 308 of gasification reactor 208. Gasification cavity 252 is also partially defined by a tail end cover (not shown) that is sealingly coupled to at least a portion of reactor wall 304, wherein the tail end cover is positioned on a tail end portion 310 that is in opposition to head end portion 308. Alternatively, head end cover 306, head end portion 308, the tail end cover and tail end portion 310 are oriented in any position relative to reactor wall 304, including any orientation that facilitates operation of gasification reactor 208 as described herein. Furthermore, reactor wall 304 may be of any configuration that facilitates operation of gasification reactor 208 as described herein. Moreover, alternatively, gasification reactor 208 has any suitable configuration that facilitates operation of IGCC plant 100 as described herein.

Injection device 250 includes a tip portion 312 that is inserted through an aperture 314 defined in head end cover 306 and sealingly coupled to head end cover 306 using a fastening method that includes, but is not limited to, retention hardware (not shown in FIG. 2). Gasification reactor 208 is configured such that an axial centerline 316 of injection device 250 is collinear with a longitudinal centerline 317 of gasification cavity 252. Tip portion 312 is configured to form a plurality of recirculation zones within gasification cavity 252. Specifically, tip portion 312 is configured to form a first recirculation zone 320 a first distance $D_1$ from tip portion 312 within gasification cavity 252. First recirculation zone 320 has a shape that is substantially toroidal and the shape is one of substantially spatially continuous or partially segmented. Moreover, first recirculation zone 320 is positioned close to and, with respect to centerline 317, substantially centered about centerline 317. Also, specifically, tip portion 312 is configured to form a second recirculation zone 322 a second distance $D_2$ from tip portion 312 within gasification cavity 252. Second recirculation zone 322 has a shape that is substantially toroidal and the shape is one of substantially spatially continuous or partially segmented. Moreover, second recirculation zone 322 is positioned with respect centerline 317, which is, substantially centered about centerline 317, and in close proximity to reactor wall 304. First recirculation zone 320 is proximately centered within second recirculation zone 322.

Alternative embodiments of gasification reactor 208 may include a plurality of injection devices 250, wherein each injection device 250 has an axial centerline 316, such that each associated axial centerline 316 is co-linear with a predefined axial orientation similar to centerline 317. Each of such plurality of injection devices 250 may have either a vertical, i.e., directly upward and/or directly downward, and/or a horizontal orientation, including any orientation between purely vertical and purely horizontal orientations, that facilitates operation of gasification reactor 208 as described herein. Furthermore, such alternative embodiments of gasification reactor 208 may include a plurality of injection devices 250, wherein all of injection devices 250 have a substantially similar orientation. Moreover, such alternative embodiments of gasification reactor 208 may include a plurality of injection devices 250, wherein a first number of such injection devices 250 have a differing orientation than a second number of such injection devices 250.

Still further alternative embodiments of gasification reactor 208 may include a plurality of injection devices 250 wherein injection devices 250 are distributed across one or more surfaces of gasification reactor 208, each injection device 250 with a differing orientation. Moreover, injection device 250 making up at least a portion of the plurality of injection devices 250 may each be placed in a dedicated cavity (not shown) that is a part of, or otherwise joined with, gasification reactor 208, thereby facilitating separate formation or development of multiple recirculation zones from each such injection device 250.

Figure 3:
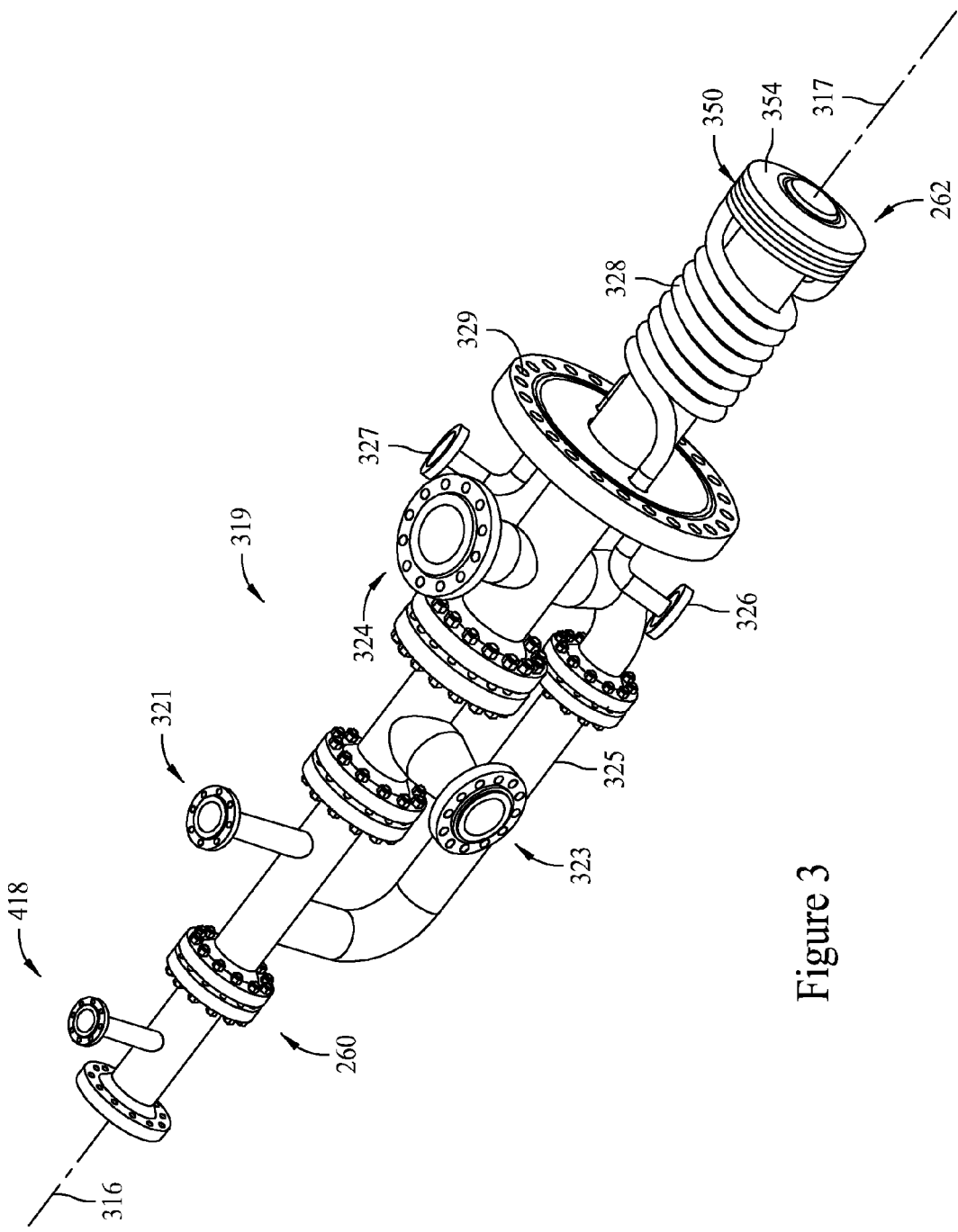
FIG. 3 is a schematic perspective view of an exemplary injector feed assembly that may be used with the gasification reactor shown in FIG. 2.

FIG. 3 is a schematic perspective view of an exemplary injector feed assembly 319 that may be used with gasification reactor 208 (shown in FIG. 2). Injection device axial centerline 316 and gasification cavity longitudinal centerline 317 are illustrated for perspective. Injector feed assembly 319 includes an inner oxygen ($O_2$) supply section 321 that is coupled in flow communication to an $O_2$ source similar to $O_2$ conduit 210 (shown in FIG. 1). Injector feed assembly 319 also includes a middle slurry supply section 323 that is coupled in flow communication to a slurry source similar to pet coke slurry conduit 214 (shown in FIG. 1). Injector feed assembly 319 further includes an outer $O_2$ supply section 324 that is coupled in flow communication to an $O_2$ source similar to $O_2$ conduit 210. At least a portion of outer oxygen supply section 324 extends about at least a portion of slurry supply section 323, at least a portion of slurry supply section 323 extends about at least a portion of inner oxygen supply section 321, and, at least a portion of outer oxygen supply section 324 extends about at least a portion of inner oxygen supply section 321. Moreover, sections 321, 323, and 324 terminate where they join tip portion 312 in flow communication. Therefore, sections 321, 323 and 324 define a plurality of substantially concentric passages or channels, or, specifically, an inner $O_2$ channel, a middle slurry channel, and an outer $O_2$ channel (neither shown in FIG. 3) within injector feed assembly 319.

Injector feed assembly 319 also includes an $O_2$ bypass line 325 that establishes at least some flow communication between sections 324 and 321 such that a predetermined $O_2$ mass flow rate distribution is facilitated based at least partially upon cumulative predetermined $O_2$ pressure drops that occur as $O_2$ is channeled through sections 321 and 324, $O_2$ bypass line 325, and subsequent components as $O_2$ is discharged from injector feed assembly 319. Therefore, maintaining predetermined ratios of an outer $O_2$ mass flow rate and an inner $O_2$ mass flow rate (neither shown) are facilitated. Bypass line 325 facilitates installation and operation of injector feed assembly 319 in retrofits of gasification reactor 208. Alternatively, methods that include, but are not limited to flow orifices and manually-operated and automated throttle valves are used in conjunction with, or in lieu of, bypass line 325.

Injector feed assembly 319 further includes a cooling fluid inlet manifold 326 and a cooling fluid outlet manifold 327 coupled in flow communication with tip portion 312 of injection device 250 via a plurality of cooling fluid coils 328. Manifolds 326 and 327 and coils 328 facilitate channeling a cooling fluid to remove heat from tip portion 312 (discussed in more detail below). Injector feed assembly 319 also includes a mounting flange 329 that is removably and sealingly coupled to head end cover 306 using a fastening method that includes, but is not limited to, retention hardware (not shown). Alternatively, injector feed assembly 319 has any number of coolant connections and/or coolant flow means that facilitate operation of injection device 250 as described herein.

Figure 4:
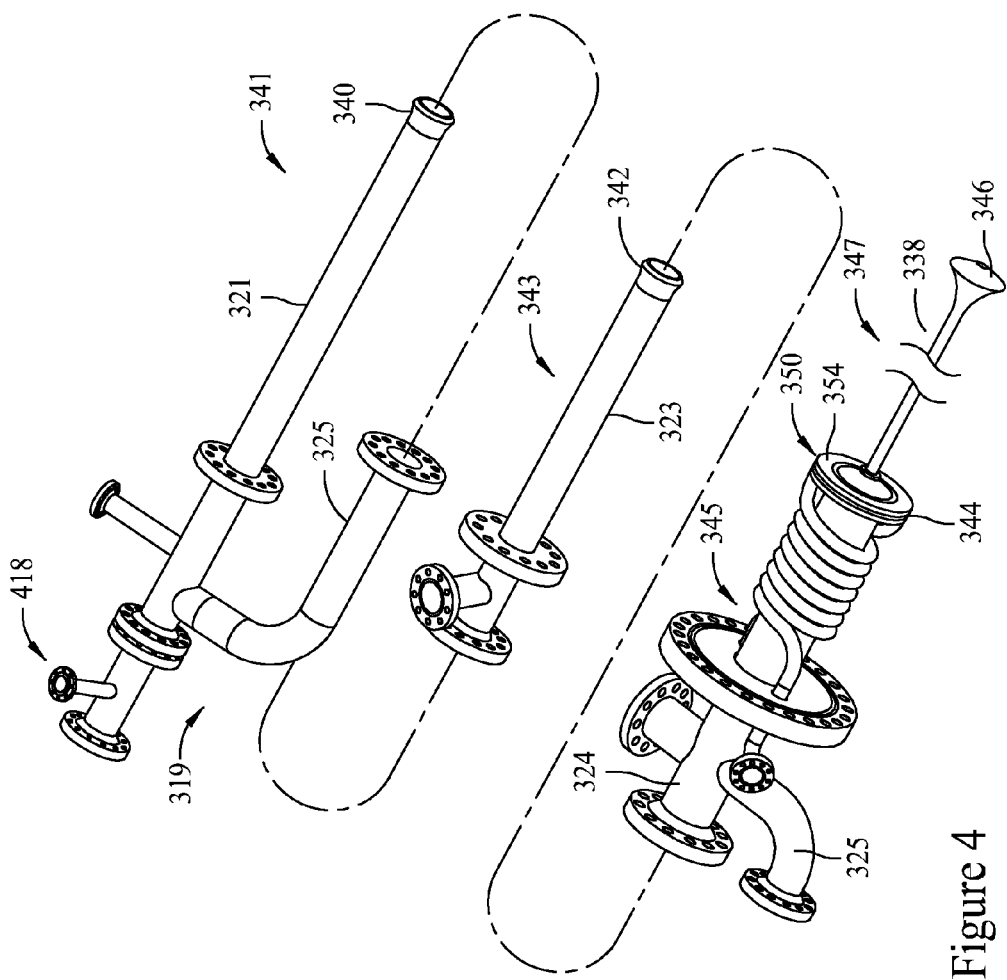
FIG. 4 is an exploded view of the exemplary injector feed assembly shown in FIG. 3.

FIG. 4 is an exploded view of exemplary injector feed assembly 319. In the exemplary embodiment, inner oxygen supply section 321 is positioned at least partially within slurry supply section 323, which is at least partially positioned within outer oxygen supply section 324. Injector feed assembly 319 has a "bayonet" design, wherein sections 321, 323, and 324 are also referred to as bayonets. In the exemplary embodiment, injector feed assembly 319 also includes a cooling lance 338. An inner oxygen supply tip portion 340 is coupled to tip end 262 of inner oxygen supply section 321. Inner oxygen supply tip portion 340 and inner oxygen supply section 321 form an inner oxygen bayonet assembly 341. A slurry supply tip portion 342 is coupled to tip end 262 of slurry supply section 323. Slurry tip portion 342 and slurry supply section 323 form a slurry bayonet assembly 343. An outer oxygen supply tip portion 344 is coupled to tip end 262 of outer oxygen supply section 324. Outer oxygen supply tip portion 344 and outer oxygen supply section 324 form an outer oxygen bayonet assembly 345. Furthermore, a lance tip 346 is coupled to tip end 262 of cooling lance 338. Lance tip 346 and cooling lance 338 form a cooling bayonet assembly 347. Although described as being coupled, supply sections 321, 323, 324, and cooling lance 338, may be initially manufactured to include tip portions 340, 342, 344, and 346, respectively.

Figure 5:
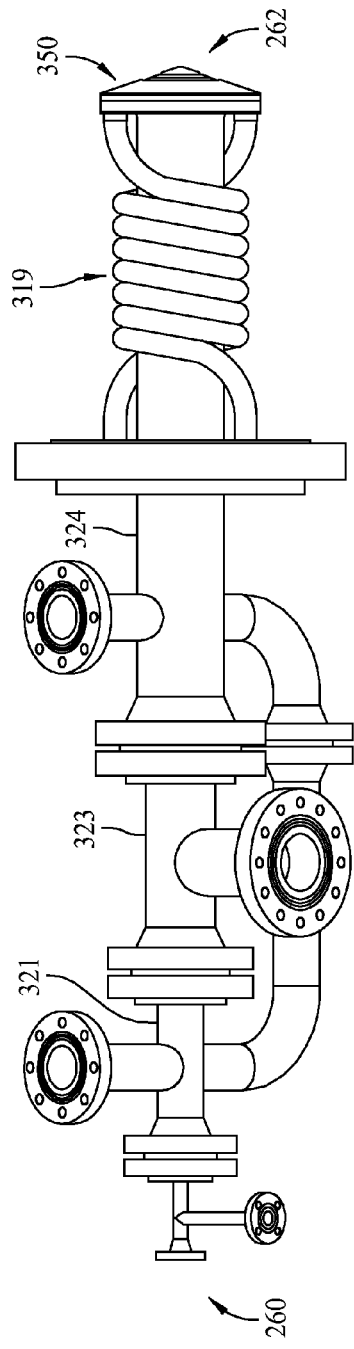
FIG. 5 is a side view of the injector feed assembly shown in FIGS. 3 and 4.
Figure 6:
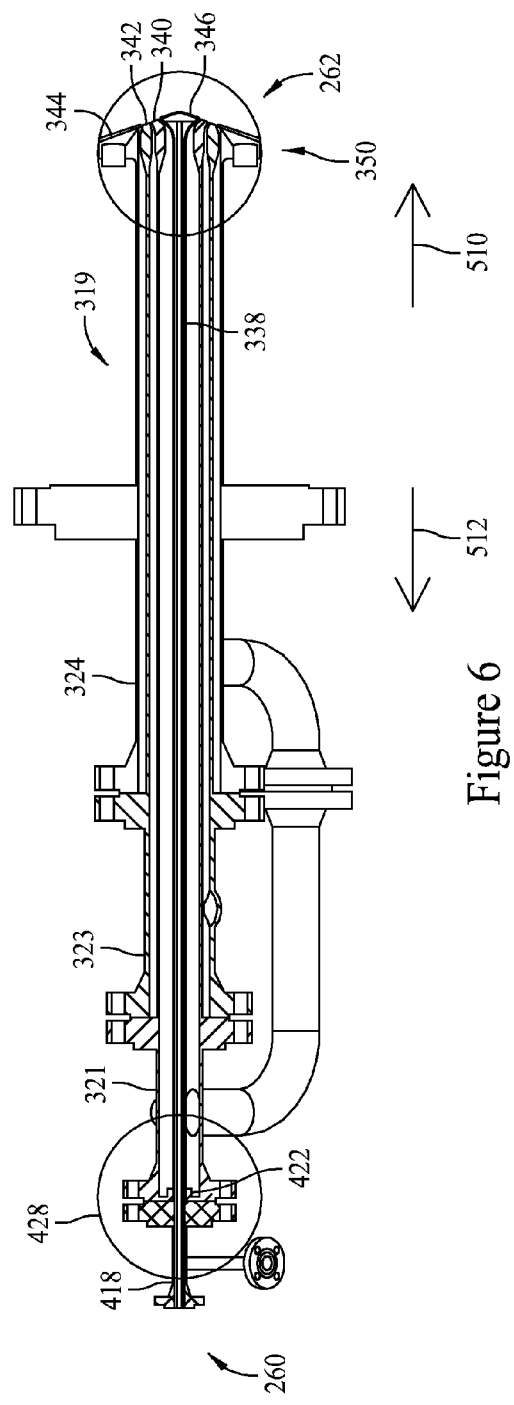
FIG. 6 is a partial cut-away side view of the injector feed assembly shown in FIGS. 3 and 4.
Figure 7:
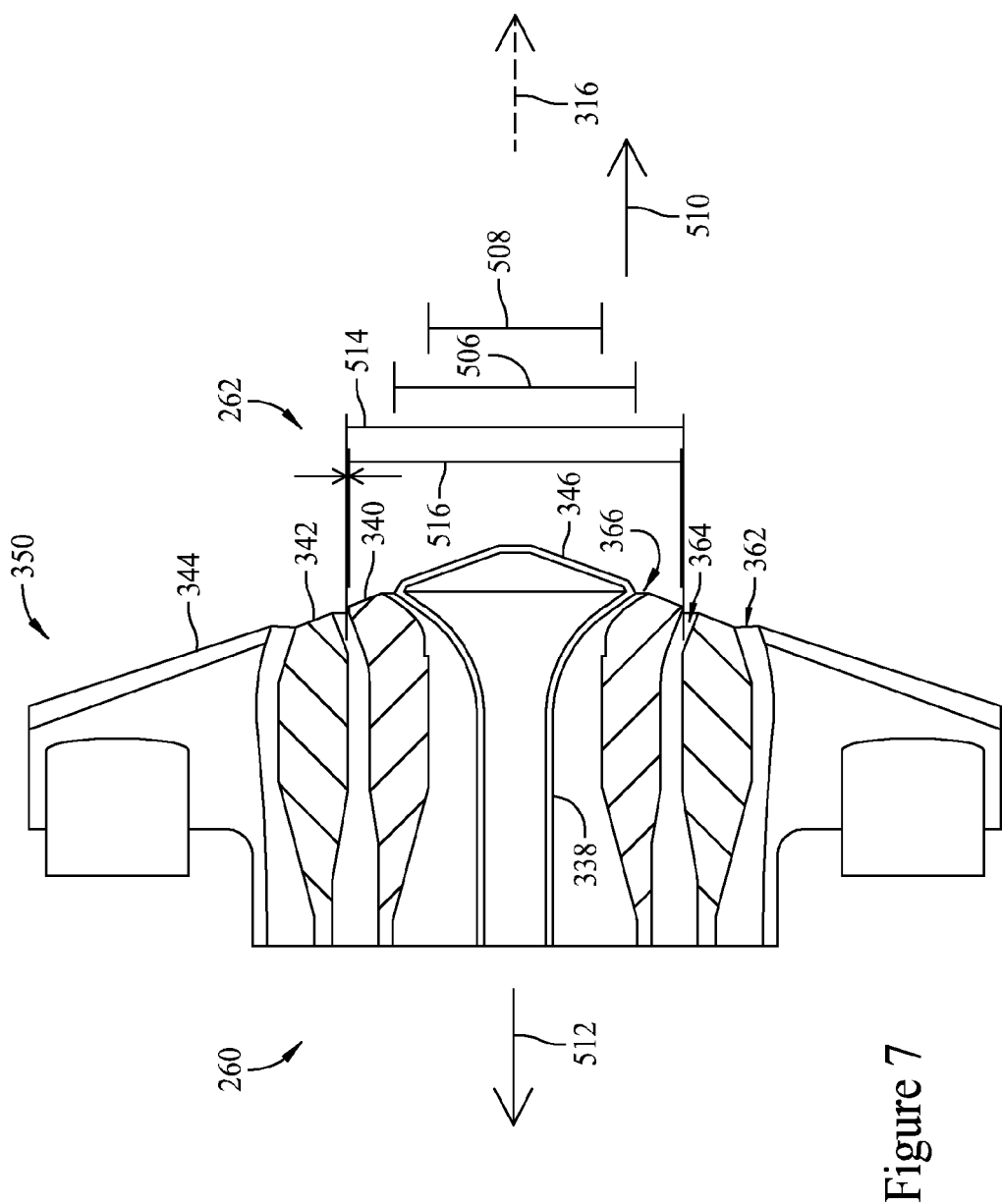
FIG. 7 is a cut-away side view of a tip portion of the injector feed assembly shown in FIGS. 3 and 4.

FIG. 5 is a side view of exemplary injector feed assembly 319. FIG. 6 is a partial cut-away side view of exemplary injector feed assembly 319. Components that are the same in FIGS. 4-6 are identified with the same reference numerals. FIG. 7 is a partial cut-away side view of an injector tip 350 (shown in FIG. 6) of injector feed assembly 319. In the exemplary embodiment, injector tip 350 includes tip portions 340, 342, 344, and 346 and controls the distribution of supply fluids between injector feed assembly 319 and gasification cavity 252 (shown in FIG. 2). More specifically, outer gaseous oxygen (GOX) supply tip portion 344 and slurry supply tip portion 342 partially define an outer GOX supply nozzle 362. Slurry supply tip portion 342 and inner GOX supply tip portion 340 partially define a reactant, or slurry, supply nozzle 364. Slurry supply nozzle 364 is in flow communication with a middle coal slurry channel (not shown in FIG. 4) defined and extending within injector feed assembly 319. In the exemplary embodiment, inner GOX supply tip portion 340 and lance tip 346 define an inner reactant nozzle, that is, an inner GOX supply nozzle 366. Inner GOX supply nozzle 366 and outer GOX supply nozzle 362 are coupled in flow communication with an inner and an outer oxygen channel defined and extending within injector feed assembly 319. Alternatively, nozzles 366 and 362 are oriented to channel any process fluid that facilitates operation of gasification reactor 208 including, but not limited to, steam, nitrogen, and carbon dioxide, and nozzles 366 and 362 are coupled in flow communication with the appropriate fluid sources.

To form first recirculation zone 320 and second recirculation zone 322 (both shown in FIG. 2), injector tip 350 includes both diverging and converging nozzles. More specifically, inner GOX supply nozzle 366 and slurry supply nozzle 364 direct respective process fluids away from injection device axial centerline 316, and are referred to as diverging nozzles. Outer GOX supply nozzle 362 directs a respective process fluid toward injection device axial centerline 316, and is therefore referred to as a converging nozzle.

Injection device 250, which includes injector feed assembly 319 with injector tip 350 having both diverging and converging nozzles including nozzles 362, 364, and 366, facilitates mixing of the reactant streams, that is, the slurry and GOX streams (neither shown in FIG. 5) at predetermined angles with predetermined momentums. Nozzles 362, 364, and 366 also facilitate improving an efficiency of chemical reactions between the slurry and oxygen.

Orienting and configuring nozzles 362, 364, and 366 as discussed herein has beneficial results that include, but are not limited to, facilitating vaporization of the reactants. Specifically, forming recirculation zones 320 and 322 facilitates increasing a residence time of the slurry and GOX such that exothermic reactions between the carbonaceous material and GOX occur more effectively. Moreover, an additional benefit of forming such recirculation zones 320 and 322 in the vicinity of head end portion 308 (shown in FIG. 2) facilitates increasing heat release in that vicinity, and therefore facilitates vaporization of water in the slurry stream. However, due to localized exothermic reactions and associated heat releases, portions of injection device 250, that is, at least one outer surface of injection device 250, is exposed to hot syngas (not shown) including, but not limited to, an external surface 354 (also shown in FIG. 3) of injector tip 350.

Initial assembly of, as well as post-commissioning field service and maintenance disassembly and reassembly of, known injector assemblies are complicated by including both diverging and converging nozzles within such injector assemblies. For example, in most cases, it is difficult to remove a known bayonet having a diverging tip that at least partially forms a diverging nozzle from a next larger known bayonet if the larger bayonet has a converging tip with a converging nozzle since such converging tip interferes with axial removal of such diverging tip. One method of disassembly includes removing the injector feed assembly from gasification cavity 252 (shown in FIG. 2) and cutting off the tips of known bayonets in order to disassemble the injector feed assembly.

However, in the exemplary embodiment, injector assembly 319 simplifies assembly, disassembly, and field service of injection device 250 while facilitating the use of a combination of diverging and converging nozzles 362, 364, and 366. This simplification is achieved by coupling cooling lance 338 within injector feed assembly 319 using a flange 422. Bayonets 321, 323, and 324, and more specifically, tip portions 340 and 342, and flange 422 are sized such that each bayonet can be removed from the next larger bayonet and respective tip portion.

Therefore, injector tip 350 facilitates mixing of reactant streams and increasing a residence time of the slurry and GOX such that exothermic reactions between the carbonaceous material and GOX occur more effectively, facilitates increasing heat release in close proximity to injector tip 350, and therefore facilitates vaporization of water in the slurry stream, and facilitates assembly, disassembly, and field service of injection device 250.

In the exemplary embodiment, inner oxygen supply section tip portion 340 is coupled to inner oxygen supply section 321, for example, by welding tip portion 340 to inner oxygen supply section 321, to form a single piece. Alternatively, inner oxygen supply tip portion 340 may be included within inner oxygen supply section 321 during the manufacture of inner oxygen supply section 321. Similarly, slurry supply tip portion 342 and outer oxygen supply tip portion 344 may be included within, or coupled to slurry supply section 323 and outer oxygen supply section 324, respectively, in any suitable manner that allows injector feed assembly 319 to function as described herein. To facilitate assembly and disassembly of injector feed assembly 319, while including a cooling system and converging and diverging nozzles that are welded in position, inner cooling lance 338 is provided. Inner cooling lance 338, in combination with inner oxygen supply tip portion 340, partially define diverging inner oxygen supply nozzle 366. Cooling lance 338 is coupled in flow communication to a cooling source, for example, through a cooling supply and/or return section 418 located at terminal end 260 of injector feed assembly 319. Lance 338 may include elements not shown that facilitate the flow and distribution of coolant within cooling lance 338 and section 418 to facilitate operation of injector feed assembly 319 as described herein. Cooling supply section 418 is coupled to terminal end 260 of inner oxygen supply section 321. At least a portion of inner oxygen supply section 321, slurry supply section 323, and outer oxygen supply section 324 extend about at least a portion of cooling lance 338. Therefore, as described above, sections 321, 323, and 324, and cooling lance 338 define a plurality of substantially annular passages or channels within injector feed assembly 319. In an exemplary embodiment, cooling lance 338 extends from tip end 262 of injector feed assembly 319 to at least terminal end 260 of inner oxygen supply section 321. Terminal end 260 of cooling lance 338 further includes flange 422. In combination with at least one fastening device (not shown in FIG. 7), flange 422 couples cooling lance 338 to at least one of sections 321, 323, 324, and 418.

Figure 8:
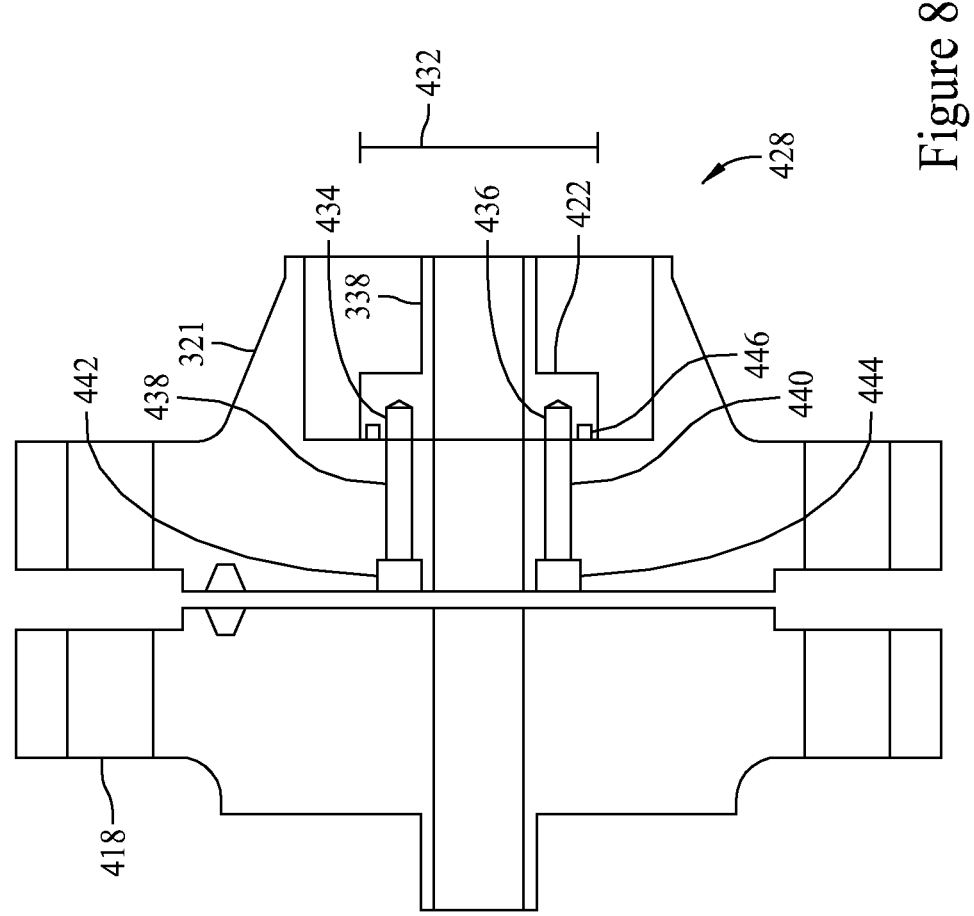
FIG. 8 is a cut-away side view of an exemplary flange portion of the injector feed assembly shown in FIGS. 3 and 4.

FIG. 8 is an exploded view of a portion 428 (shown in FIG. 6) of injector feed assembly 319. Specifically, portion 428 of injector feed assembly 319 includes inner oxygen supply section 321, cooling supply/return section 418, and flange 422. Flange 422 has a diameter 432, and includes at least one threaded fastener opening, for example, but not limited to, threaded fastener openings 434 and 436, that extend at least partially through flange 422. Fastener openings 434 and 436 are substantially concentrically aligned with at least one counter-bored fastener opening that extends through inner oxygen supply section 321, for example, fastener openings 438 and 440, which include respective counter-bored sections 442 and 444. Counter-bored sections 442 and 444 enable fasteners (not shown in FIG. 8), for example threaded fasteners such as, but not limited to, Allen-head type screws, to releasably couple cooling lance 338 to inner oxygen supply section 321, without interfering with the coupling between inner oxygen supply section 321 and cooling supply/return section 418. Inner oxygen supply section 321 and cooling supply section 418 are coupled using, for example, threaded fasteners (not shown in FIG. 8). Cooling supply/return section 418, inner oxygen supply section 321, and cooling lance 338 provide flow communication between a cooling fluid supply (not shown in FIG. 8) and lance tip 346. Flange 422 includes a seal assembly 446, such as an omega-type seal assembly, positioned between flange 422 and inner oxygen supply section 321.

Because lance tip 346 has an outer diameter 506 that is larger than an inner diameter 508 of inner oxygen supply tip portion 340, inner oxygen supply tip portion 340 cannot be removed from injector feed assembly 319 by sliding inner oxygen supply tip portion 340 along axial centerline 316, in a first direction 510 towards tip end 262. Also, cooling lance 338 cannot be removed from injector feed assembly 319 by sliding cooling lance 338 in a second direction 512, toward terminal end 260. Slurry supply tip portion 342 has an inner diameter 514 that is larger than an outer diameter 516 of inner oxygen supply tip portion 340. Diameter 514 enables inner oxygen supply tip portion 340 to be removed from within slurry supply tip portion 342 by slidably removing inner oxygen supply section 321 in direction 512.

Diameter 432 of flange 422 (shown in FIG. 8) is smaller than inner diameter 508 of inner oxygen supply tip portion 340. Specifically, diameter 508 enables cooling lance 338 to be removed from inner oxygen supply section 321 by sliding cooling lance 338, in first direction 510, and by then removing flange 422 from tip end 262 of injector feed assembly 319.

For example, during disassembly of injector feed assembly 319, cooling supply section 418 is removed from inner oxygen supply section 321. Removing cooling supply section 418 from inner oxygen supply section 321 provides access to counter-bored sections 442 and 444 (shown in FIG. 8) of fastener openings 438 and 440 (shown in FIG. 8) and to the fasteners that secure inner oxygen supply section 321 to flange 422. Cooling lance 338 is then removed from tip end 262 of injector feed assembly 319.

Inner oxygen supply section 321 is then unfastened from slurry supply section 323 and inner oxygen supply section 321 is slid from within slurry supply section 323. Slurry supply section 323 is then unfastened and removed from within outer oxygen supply section 324. Assembly is performed in reverse order. Although described herein as facilitating coupling cooling lance 338 to inner oxygen supply section 321, flange 422, in combination with inner oxygen supply section 321 and cooling supply section 418, may be configured such that flange 422 facilitates coupling cooling lance 338 to cooling supply section 418.

Figure 9:
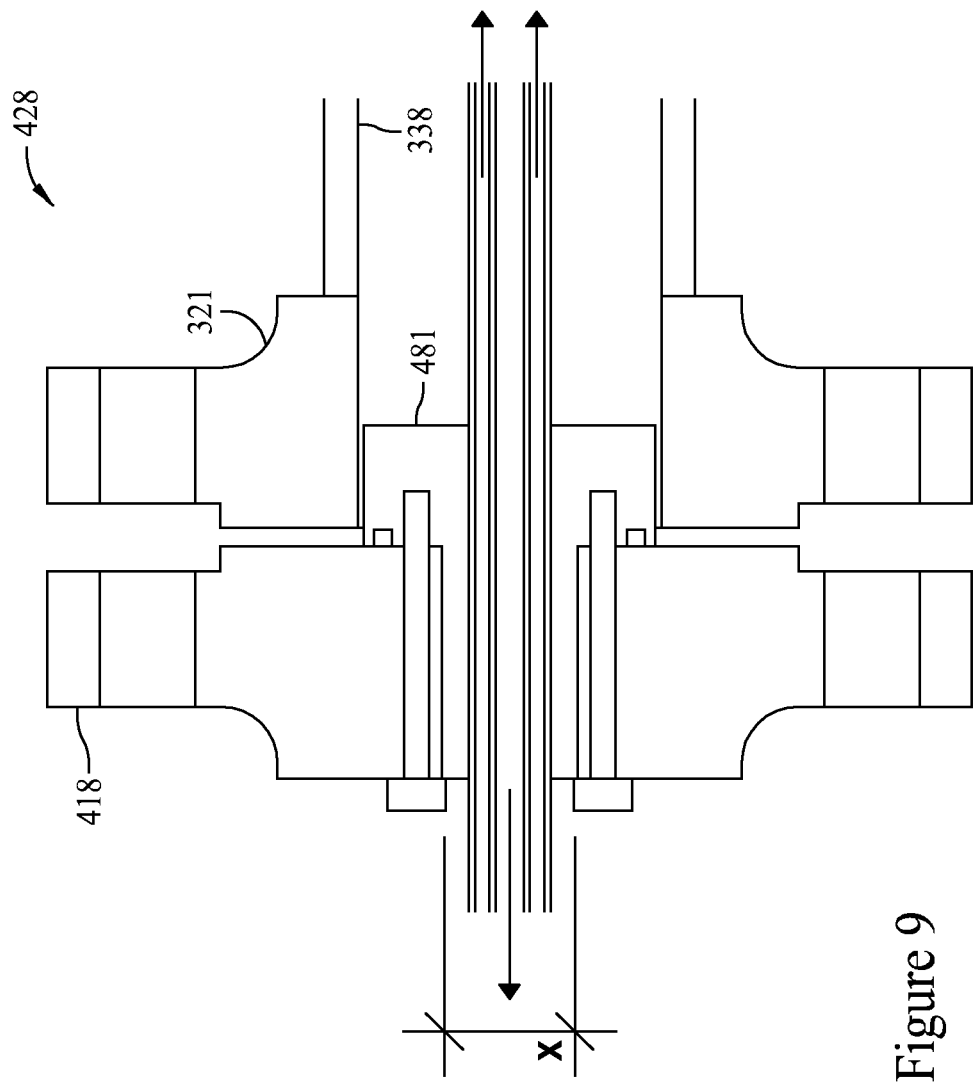
FIG. 9 is a cut-away side view of an alternative embodiment of a flange portion of the injector feed assembly shown in FIGS. 3 and 4.

FIG. 9 is an exploded view of a portion 428 (shown in FIG. 6) of injector feed assembly 319. Elements shared between FIGS. 8 and 9 are identified with the same reference numerals. In an alternative embodiment, injector feed assembly 319 includes a flange 481. Flange 481 is coupled to cooling lance 338. Flange 481 is also coupled to cooling supply section 418.

Figure 10:
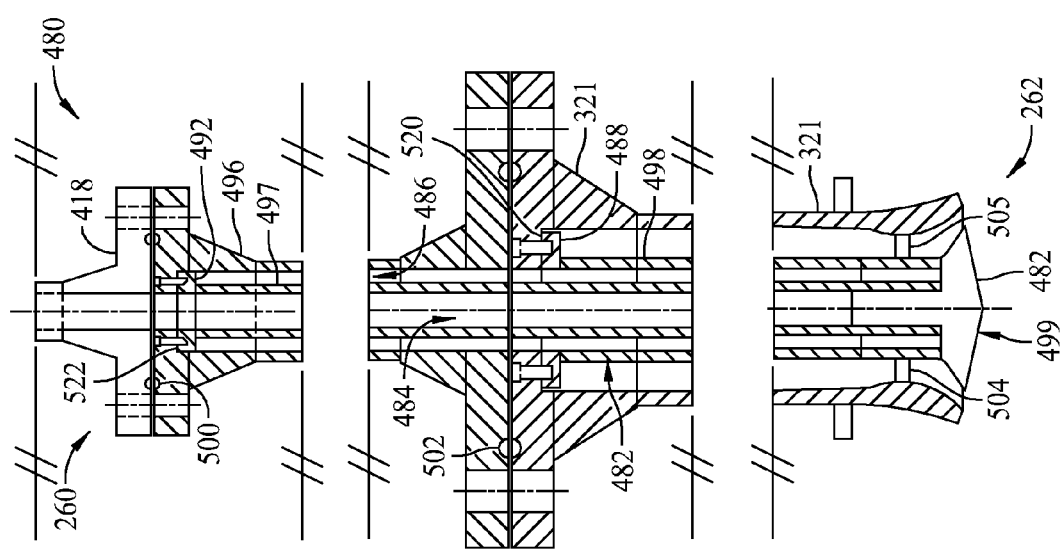
FIG. 10 is a cut-away side view of an alternative embodiment of the injector feed assembly shown in FIGS. 3 and 4.

FIG. 10 is an exemplary embodiment of an alternative injector feed assembly 480 that may be included within injection device 250 (shown in FIG. 3). Injector feed assembly 480 is similar to injector feed assembly 319 (shown in FIGS. 3-8), however, injector feed assembly 480 includes a cooling lance 482 that at least partially defines a cooling fluid inlet channel 484 and a cooling fluid return channel 486. In the exemplary embodiment, cooling lance 482 includes two flanges, for example a first flange 488 and a second flange 492. Injector feed assembly 480 includes a cooling return section 496 that is coupled between inner oxygen supply section 321 and cooling supply section 418. In the exemplary embodiment, first flange 488 is coupled to inner oxygen supply section 321, and second flange 492 is coupled to cooling return section 496, in a manner similar to that described above with respect to flange 422. Furthermore, a seal assembly 520 is positioned between flange 488 and section 321 and a seal assembly 522 is positioned between flange 492 and section 496. Seal assemblies 520 and 522 prevent fluid from leaking between channels within injector feed assembly 480.

In the exemplary embodiment, cooling lance 482 includes an inner conduit 497, an outer conduit 498, and a lance tip 499. Inner conduit 497 extends from tip end 262 of injector feed assembly 480 to terminal end 260 of cooling return section 496. Outer conduit 498 extends from tip end 262 of injector feed assembly 480 to terminal end 260 of inner oxygen supply section 321. Cooling fluid provided to cooling fluid inlet channel 484, is channeled through cooling supply section 418, cooling return section 496, and inner oxygen supply section 321 until reaching lance tip 499. Cooling fluid return channel 486 is coupled in flow communication with cooling fluid inlet channel 484, such that at lance tip 499, cooling fluid enters cooling fluid return channel 486 from cooling fluid inlet channel 484. The cooling fluid from cooling fluid return channel 486 is discharged from injector feed assembly 480 through a cooling fluid return assembly (not shown in FIG. 10) coupled within cooling return section 496. A thermal expansion device, for example, a bellows, may be included within cooling lance 482 to account for differential thermal expansion.

Injector feed assembly 480 may include at least one seal assembly, for example, a seal assembly 500 positioned between cooling supply section 418 and cooling return section 496 and a seal assembly 502 positioned between cooling return section 496 and inner oxygen supply section 321. Seal assemblies 500 and 502 facilitate preventing fluid from leaking out of injector feed assembly 480.

Injector feed assembly 480 also may include at least one fin, for example, fins 504 and 505. Fins 504 and 505 extend radially from cooling lance 482 and maintain a separation between cooling lance 482 and inner oxygen supply section 321. Fins 504 and 505 may also be referred to as struts or centering fins.

To disassemble injector feed assembly 480, cooling supply section 418 is uncoupled from cooling return section 496. Once cooling supply section 418 is uncoupled from cooling return section 496, flange 492 may be uncoupled from cooling return section 496. Cooling return section 496 is then uncoupled from inner oxygen supply section 321, which exposes fasteners used to couple flange 488 to inner oxygen supply section 321. After flange 492 and flange 488 are uncoupled, cooling lance 482 is removed from injector feed assembly 480 through the tip end 262 of injector feed assembly 480. Although described herein as included in cooling lances 338 and 482, flanges and/or seals may also be included at terminal ends 260 of inner oxygen supply section 321 and/or slurry supply section 323 for coupling those sections within injector feed assemblies 319 and/or 480.

Figure 11:
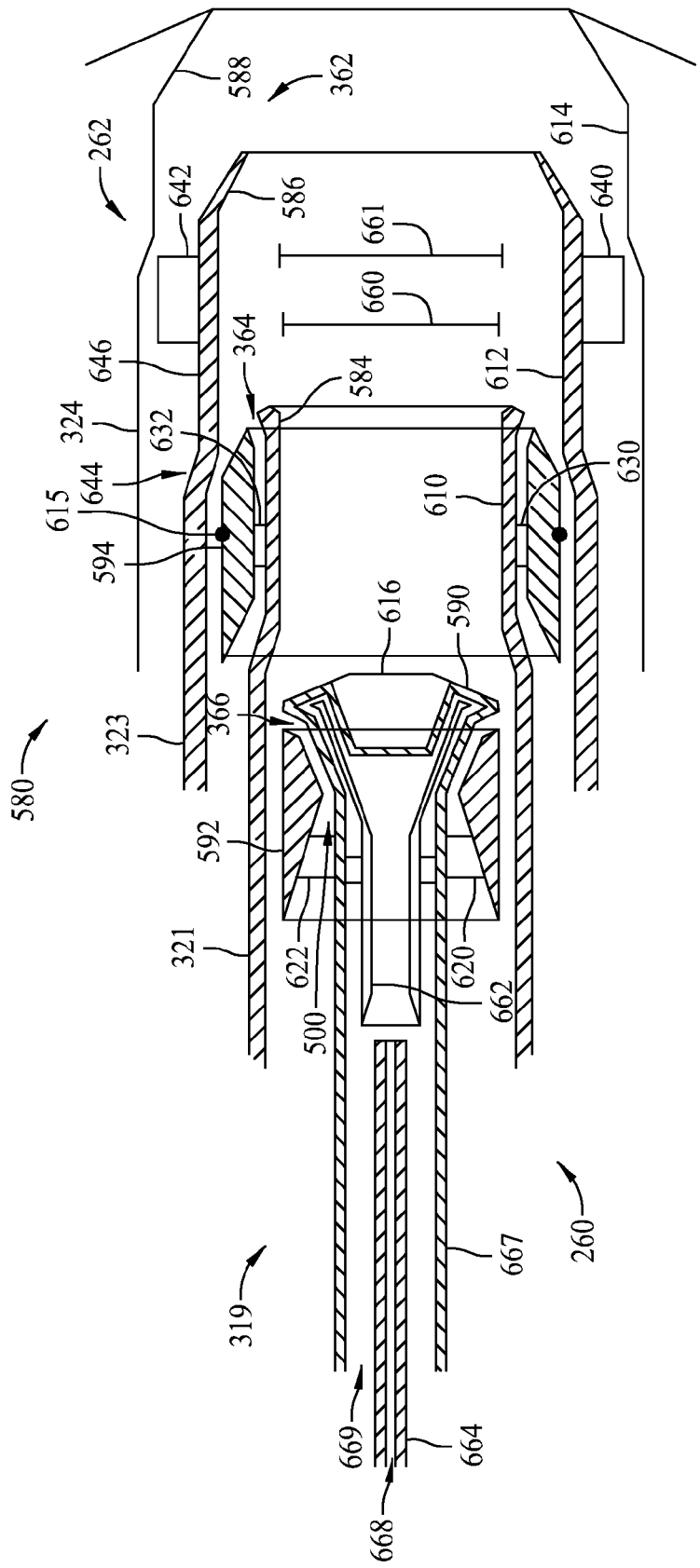
FIG. 11 is a cut-away exploded view of another alternative embodiment of the injector feed assembly shown in FIGS. 3 and 4.

FIG. 11 is a cut-away exploded side view of a second alternative injector feed assembly 580 that may be used in injection device 250 (shown in FIG. 3). Injector feed assembly 580 includes an inner oxygen injector section 584, a slurry injector section 586, an outer oxygen injector section 588, a cooling tip section 590, and at least one tip collar, for example, a first tip collar 592 and/or a second tip collar 594. Injector feed assembly 580 includes alternative embodiments of inner oxygen bayonet assembly 341 (shown in FIG. 4), slurry bayonet assembly 343 (shown in FIG. 4), outer oxygen bayonet assembly 345 (shown in FIG. 4), and cooling bayonet assembly 347 (shown in FIG. 4). More specifically, in the alternative embodiment, injector feed assembly 580 includes an inner oxygen bayonet assembly 596 that includes inner oxygen injector section 584 and first tip collar 592. Injector feed assembly 580 also includes a slurry bayonet assembly 598 that includes slurry injector section 586 and second tip collar 594. Furthermore, outer oxygen injector section 588 is also referred to herein as an outer oxygen bayonet assembly and cooling tip section 590 is also referred to herein as a cooling bayonet assembly.

Inner oxygen injector section 584 is securely coupled to inner oxygen supply section 321. Slurry injector section 586 is securely coupled to slurry supply section 323. In addition, outer oxygen injector section 588 is securely coupled to outer oxygen supply section 324. Each injector section 584, 586, and 588 includes a respective tip landing surface 610, 612, and 614. Tip landing surfaces 610, 612, and 614 may be tapered, flat, or configured in any suitable manner such that as the next smaller injector assembly is inserted into the next larger injector assembly, a slip-fit (also referred to as a press-fit or friction-fit) is created between the injector assemblies. First tip collar 592 and or second tip collar 594 may include a seal 615, for example, an O-ring or any other suitable seal that allows injector feed assembly 580 to function as described herein. For example, first tip collar 592 and/or second tip collar 594 may include seal 615 to facilitate the slip-fit between tip landing surfaces 610, 612, and 614 and also to facilitate reducing leakage between surfaces 610, 612, and 614.

Tip end 262 of cooling tip section 590 partially defines inner oxygen supply nozzle 366 and in the exemplary embodiment, includes a refractory plug 616. Refractory plug 616 facilitates protecting cooling tip section 590 from heat generated in gasification cavity 252 (shown in FIG. 2). In the exemplary embodiment, first tip collar 592 circumscribes at least a portion of cooling tip section 590, such that inner oxygen supply nozzle 366 is defined. First tip collar 592 is coupled to cooling tip section 590 using at least one strut, for example, struts 620 and/or 622. Struts 620 and 622 maintain a gap between first tip collar 592 and cooling tip section 590, while allowing a fluid to pass through inner oxygen supply nozzle 366.

Inner oxygen injector section 584 also includes at least one strut, for example, struts 630 and/or 632. Second tip collar 594 circumscribes at least a portion of inner oxygen injector section 584, such that slurry supply nozzle 364 is formed. Second tip collar 594 is coupled to inner oxygen injector section 584 using struts 630 and 632. Struts 630 and 632 maintain a gap defined between second tip collar 594 and inner oxygen injector section 584, while allowing a fluid to pass through slurry supply nozzle 364.

At least one centering fin, for example, centering fins 640 and/or 642, is coupled to slurry injector section 586. Centering fins 640 and 642 maintain a gap 644 defined between outer oxygen injector section 588 and slurry injector section 586. The gap 644 defined between outer oxygen injector section 588 and slurry injector section 586 forms an outer oxygen supply nozzle 362.

In the exemplary embodiment, cooling tip section 590 is removable and includes an inner cooling supply landing 662 that provides flow communication from an inner cooling fluid supply section 664 to cooling tip section 590 using, for example, but not limited to, a slip-fit. Landing 662 and/or section 664 may incorporate a seal assembly (not shown) similar to seal assembly 615 to prevent coolant leakage between landing 662 and section 664.

Cooling tip section 590 also includes an outer cooling fluid return section 667. Inner cooling fluid supply section 664 extends from inner cooling supply landing 662 to terminal end 260 of injection device 250 wherein a cooling fluid supply (not shown in FIG. 11) is positioned. Outer cooling fluid return section 667 extends from cooling tip section 590 to terminal end 260 of injection device 250 wherein a cooling fluid exhaust (not shown in FIG. 11) is positioned. Inner cooling fluid supply section 664 and inner cooling supply landing 662 define an inner cooling channel 668. Moreover, an outer cooling fluid exhaust channel 669 is defined between inner cooling fluid supply section 664 and outer cooling fluid return section 667. Cooling fluid is supplied to cooling channel 668 and is channeled through cooling channel 668 to cooling tip section 590 wherein the cooling fluid enters outer cooling fluid exhaust channel 669. The cooling fluid from cooling fluid exhaust channel 669 is discharged from injection device 250 through a cooling fluid exhaust assembly (not shown in FIG. 11).

Figure 12:
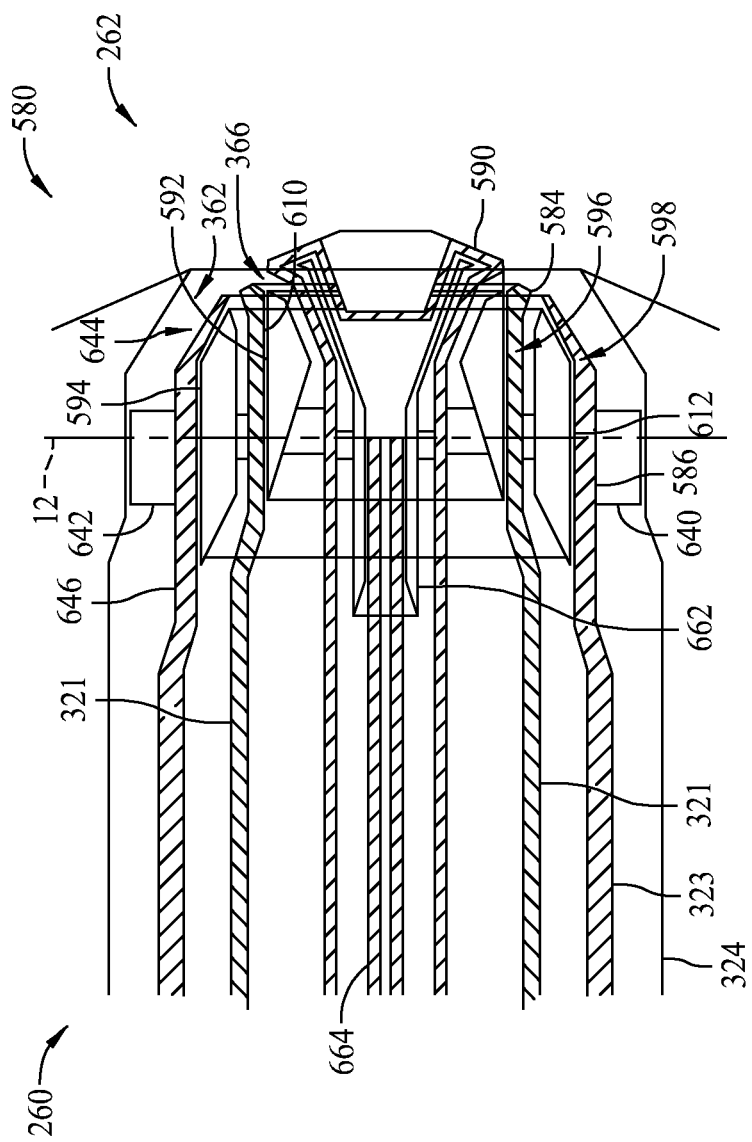
FIG. 12 is a cut-away side view of the injector feed assembly shown in FIG. 11.

FIG. 12 is a cut-away side view of injector feed assembly 580. As described above, inner cooling fluid supply section 664 is positioned within inner cooling supply landing 662. First tip collar 592 provides a slip-fit between tip landing surface 610 of inner oxygen injector section 584 and cooling tip section 590, which secures cooling tip section 590 at least partially within inner oxygen injector section 584.

As described above, inner oxygen injector section 584 is positioned at least partially within tip landing surface 612. Second tip collar 594 provides a slip-fit between tip landing surface 612 and inner oxygen injector section 584. Inner oxygen injector section 584 is retained at least partially within slurry injector section 586. Tip landing surface 612 provides a slip-fit with second tip collar 594 to secure inner oxygen injector section 584 within slurry injector assembly.

Centering fins 640 and 642 are securely coupled to an outer surface 646 of slurry injector section 586. Centering fins 640 and 642 provide a slip-fit between outer oxygen injector section 588 and slurry injector section 586, while maintaining gap 644 for outer oxygen supply nozzle 362.

Figure 13:
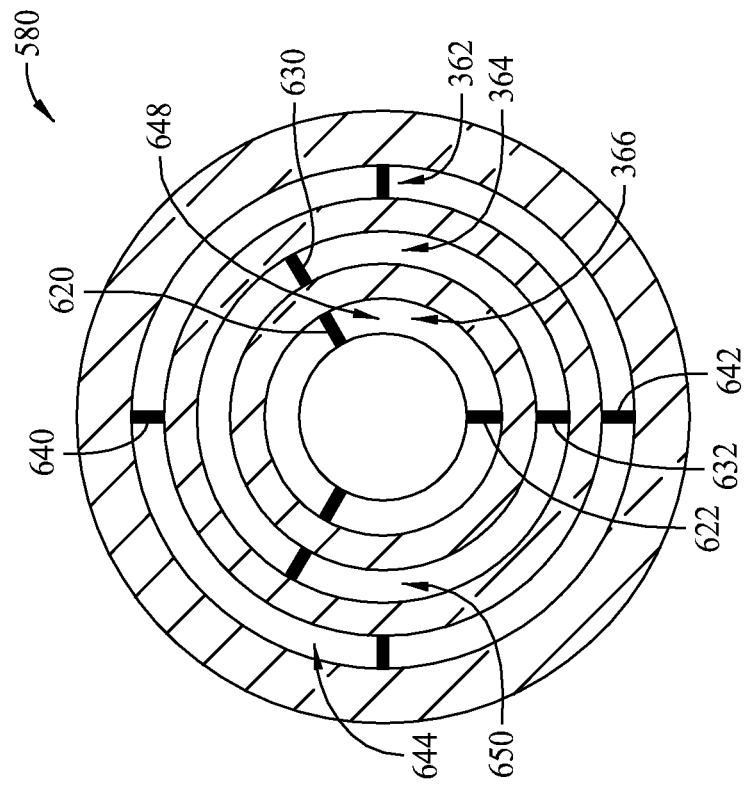
FIG. 13 is a cross-sectional view of the injector feed assembly shown in FIG. 11.

FIG. 13 is a cross-sectional view of injector feed assembly 580 at reference line 12 (shown in FIG. 12). Injector feed assembly 580 includes inner oxygen supply nozzle 366, slurry supply nozzle 364, and outer oxygen supply nozzle 362. In the exemplary embodiment, struts 620 and 622 maintain a gap 648 between first tip collar 592 and cooling tip section 590 forming inner oxygen supply nozzle 366. Struts 630 and 632 maintain a gap 650 between second tip collar 594 (shown in FIG. 13) and slurry injector section 586, forming slurry supply nozzle 364. Similarly, centering fins 640 and 642 maintain gap 644 between slurry injector section 586 and outer oxygen injector section 588, forming outer oxygen supply nozzle 362.

During assembly of injector feed assembly 580, first tip collar 592 is positioned to at least partially circumscribe cooling tip section 590. Similarly, second tip collar 594 is positioned to at least partially circumscribe inner oxygen injector section 584. Slurry injector section 586 is inserted at least partially into outer oxygen injector section 588. Inner oxygen injector section 584 is inserted at least partially into slurry injector section 586. Cooling tip section 590 is inserted at least partially into inner oxygen injector section 584. Cooling tip section 590 may be inserted and removed through terminal end 260 of inner oxygen injector section 584 since an outer diameter 660 of cooling tip section 590 is smaller than an inner diameter 661 of inner oxygen injector section 584. First tip collar 592 facilitates creating diverging inner oxygen supply nozzle 366 while using cooling tip section 590 having diameter 660, which allows for removal of cooling tip section 590 from terminal end 260 of injector feed assembly 580.

First tip collar 592 is configured to fit snuggly within inner oxygen injector section 584, adjoining landing surface 610. Similarly, second tip collar 594 fits snuggly within slurry injector section 586, adjoining landing surface 612. Inner oxygen injector section 584 is inserted into terminal end 260 of slurry supply section 323. Also, a plurality of centering fins are positioned to extend radially from outer surface 646 of slurry injector section 586. Disassembly is performed in reverse order. Forming diverging inner oxygen supply nozzle 366 between first tip collar 592 and cooling tip section 590, and forming diverging slurry supply nozzle 364 between second tip collar 594 and slurry injector section 586, facilitate assembly of injector feed assembly 580, which includes diverging nozzles 366 and 364 radially inward from converging outer oxygen supply nozzle 362. Injector feed assembly 580 may be assembled in any order as long as tip collars 592 and 594 are first coupled to cooling tip section 590 and inner oxygen injector section 584, respectively. For example, cooling tip section 590 may be inserted into inner oxygen injector section 584 before or after inner oxygen injector section 584 is inserted into slurry injector section 586.

Figure 14:
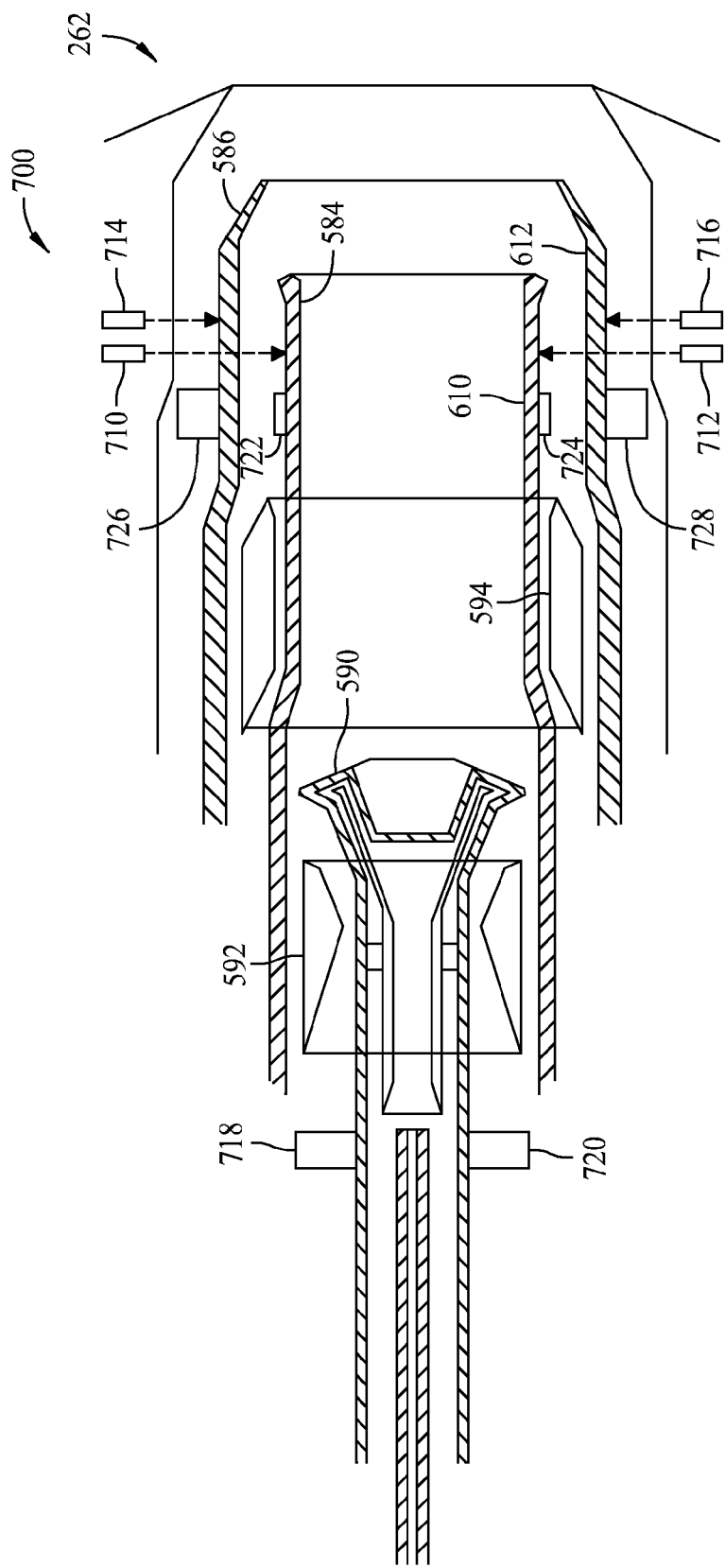
FIG. 14 is a cut-away exploded view of another alternative embodiment of the injector feed assembly shown in FIGS. 3 and 4.

FIG. 14 is a cut-away exploded side view of a third alternative injector feed assembly 700 that may be included within injection device 250 (shown in FIG. 3). Injector feed assembly 700 is similar to injector feed assembly 580 of FIG. 11 and components that are the same are identified using the same reference numerals. Injector feed assembly 700 further includes at least one anchor pin 710, 712, 714, and/or 716. Although described as anchor pins, anchor pins 710, 712, 714, and 716 may be any other fastening/spacer device that allows feed assembly 700 to function as described herein. In the exemplary embodiment, anchor pins 710, 712, 714, and 716 are positioned, for example by welding, and secure first tip collar 592 and second tip collar 594 in a predetermined position.

Figure 15:
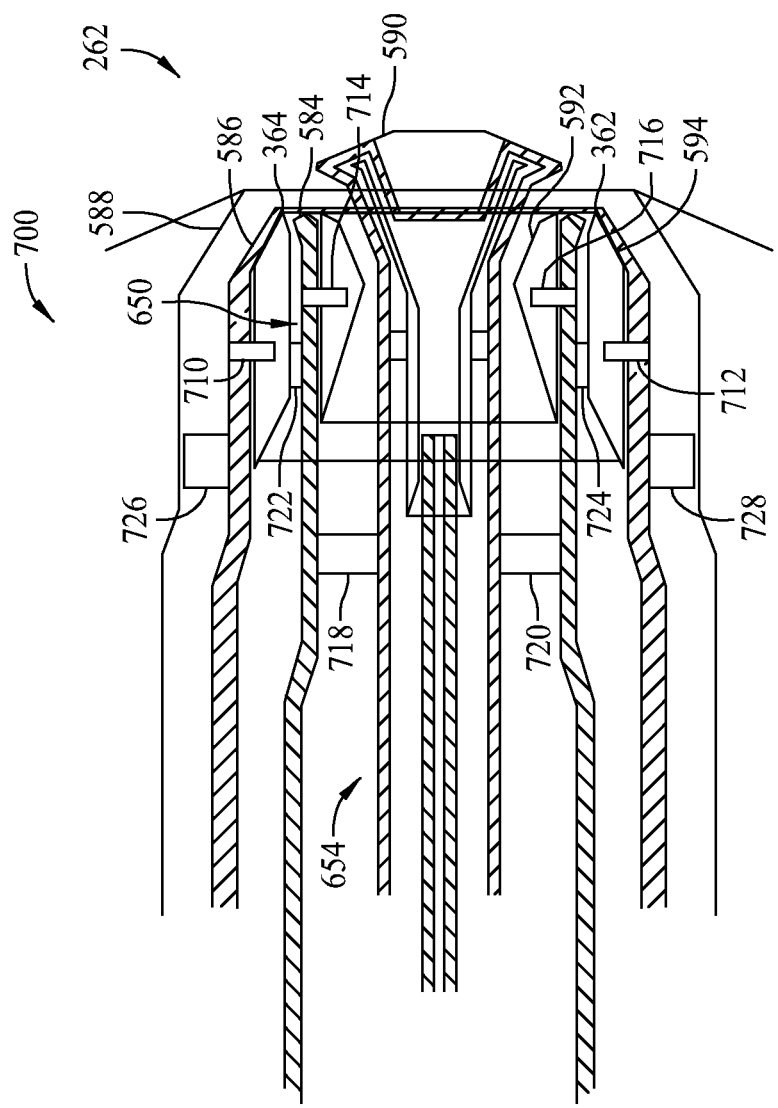
FIG. 15 is a cut-away side view of the injector feed assembly shown in FIG. 14.

FIG. 15 is a cut-away side view of injector feed assembly 700. Anchor pins 714 and 716 couple first tip collar 592 to landing surface 610. Anchor pins 710 and 712 couple second tip collar 594 to landing surface 612. At least one strut, for example, strut 718 and/or 720, positions cooling tip section 590 within inner oxygen injector section 584. At least one strut, for example, strut 722 and/or 724, positions second tip collar 594 such that gap 650 is defined between second tip collar 594 and inner oxygen injector section 584, thus forming slurry supply nozzle 364. At least one strut, for example, strut 726 and/or 728, positions outer oxygen injector section 588 such that gap 644 is defined between outer oxygen injector section 588 and slurry injector section 586, thus forming outer oxygen supply nozzle 362.

To assemble injector feed assembly 700, a plurality of struts, for example, but not limited to, struts 718 and/or 720, are positioned such that the struts extend radially from an outer surface of cooling tip section 590. Struts 718 and 720 maintain a gap 654 between cooling tip section 590 and first tip collar 592, in a similar manner to struts 620 and 622 (shown in FIG. 11). First tip collar 592 is positioned at least partially around cooling tip section 590 and cooling tip section 590 and first tip collar 592 are inserted into inner oxygen injector section 584. First tip collar 592 is secured to landing surface 610 of inner oxygen injector section 584 with anchor pins 710 and 712.

Struts 722 and/or 724 extend radially from an outer surface of the inner oxygen injector section 584. Second tip collar 594 is positioned at least partially around inner oxygen injector section 584. Inner oxygen injector section 584 and second tip collar 594 are inserted into slurry injector section 586 and second tip collar 594 is secured to landing surface 612 of slurry injector section 586 with anchor pins 714 and 716. Struts 722 and 724 maintain gap 650 between inner oxygen injector section 584 and second tip collar 594, in a similar manner to struts 630 and 632 (shown in FIG. 11).

Figure 16:
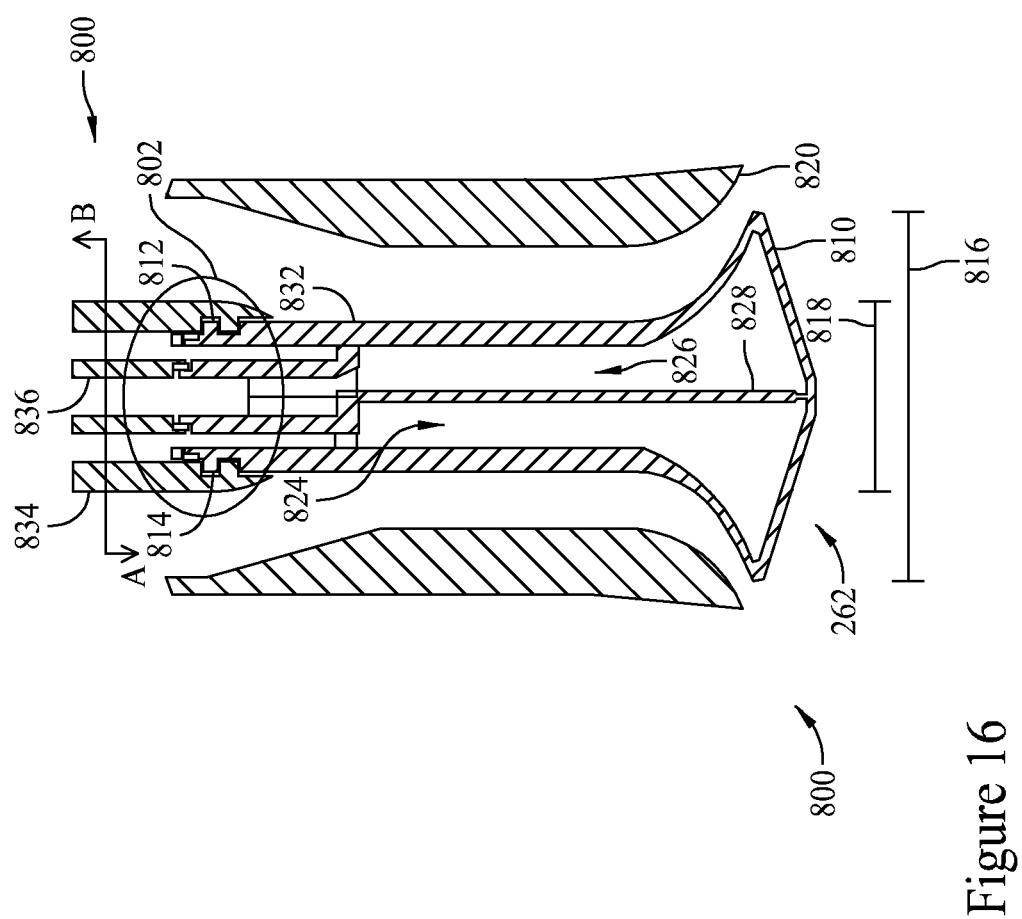
FIG. 16 is a cut-away side view of a further alternative embodiment of the injector feed assembly shown in FIGS. 3 and 4.
Figure 17:
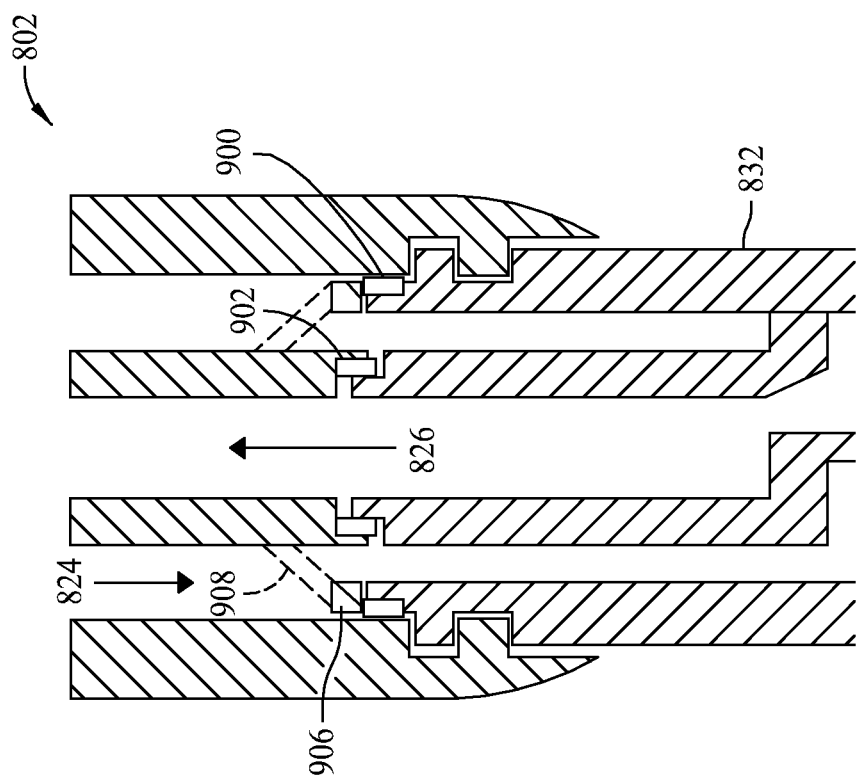
FIG. 17 is an expanded view of a portion of the injector feed assembly shown in FIG. 16.

FIG. 16 is a cut-away side view of a fourth alternative injector feed assembly 800 that may be included within injection device 250 (shown in FIG. 3). FIG. 17 is an expanded cut-away side view of a section 802 of injector feed assembly 800. Injector feed assembly 800 includes a removable tip portion 810 that includes at least one tab, for example tab 812 and/or 814. As described above with respect to injector tip 350 (shown in FIG. 7), tip portion 810 is a diverting tip that has a diameter 816 that is larger than an inner diameter 818 of the next larger bayonet, for example, an inner oxygen injector assembly 820. Tip portion 810 also includes a cooling fluid supply channel 824, and a cooling fluid return channel 826, that are separated by cooling fluid channel divider 828. An outer wall 832 of removable tip portion 810 is releasably coupled to an outer center cooling fluid bayonet 834. Tip portion 810 is inserted into tip end 262 of outer center cooling fluid bayonet 834 and releasably coupled to outer center cooling fluid bayonet 834. A tip end 262 of an inner center cooling fluid bayonet 836 is then inserted into terminal end 260 of outer center cooling fluid bayonet 834 and fastened into place. As described above with respect to injector feed assembly 480 (shown in FIG. 8), injector feed assembly 800 may include seal assemblies. For example, a first seal assembly 900 and a second seal assembly 902. First seal assembly 900 prevents fluid from leaking between channels within injector feed assembly 800. Second seal assembly 902 prevents fluid from leaking between cooling fluid return channel 826 and cooling fluid supply channel 824. Outer center cooling fluid bayonet 834 may be used cooperatively with tip portion 810 to facilitate the desired compression of seal assembly 900. Similarly, a compression ring extension 906 may be coupled to tip end 262, for example, using at least one strut 908. Compression ring extension 906 may be used in cooperation with tip portion 810 to obtain the desired compression of seal 902.

Figure 18:
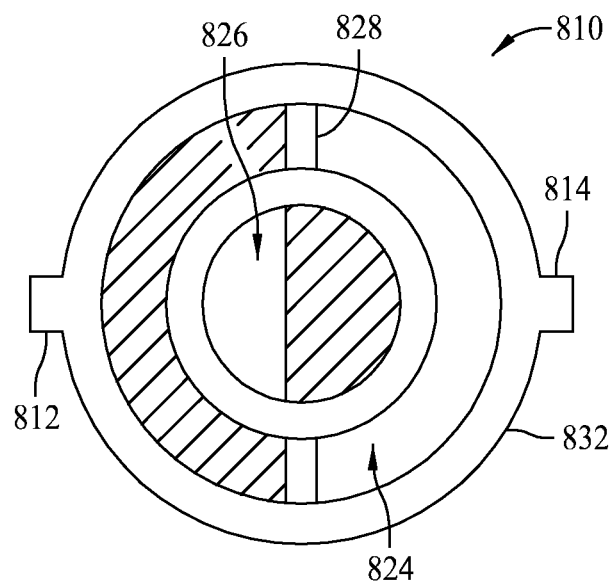
FIG. 18 is an end view of the tip portion of the injector feed assembly shown in FIG. 16.

FIG. 18 is an end view of removable tip portion 810, as viewed from perspective A (shown in FIG. 16). As described with respect to FIG. 16, tip portion 810 includes at least one tab 812 and/or 814, cooling fluid supply channel 824, cooling fluid return channel 826, and cooling fluid channel divider 828.

Figure 19:
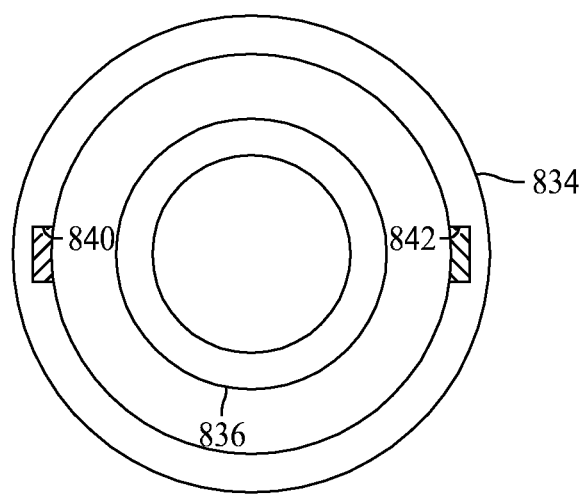
FIG. 19 is an end view of an outer center cooling fluid bayonet and an inner center cooling fluid bayonet used with the injector feed assembly shown in FIG. 16.

FIG. 19 is an end view of outer center cooling fluid bayonet 834 and inner center cooling fluid bayonet 836 from perspective B (shown in FIG. 16). Outer center cooling fluid bayonet 834 includes at least one groove, for example, groove 840 and/or 842. Grooves 840 and 842 are located within an interior surface of outer center cooling fluid bayonet 834. Outer center cooling fluid bayonet 834 and grooves 840 and 842 are configured such that terminal end 260 of tip portion 810 fits within outer center cooling fluid bayonet 834 and tabs 812 and 814 fit within grooves 840 and 842. Inner center cooling fluid bayonet 836 is configured to align with, and sealably connect with cooling fluid channel divider 828.

Figure 20:
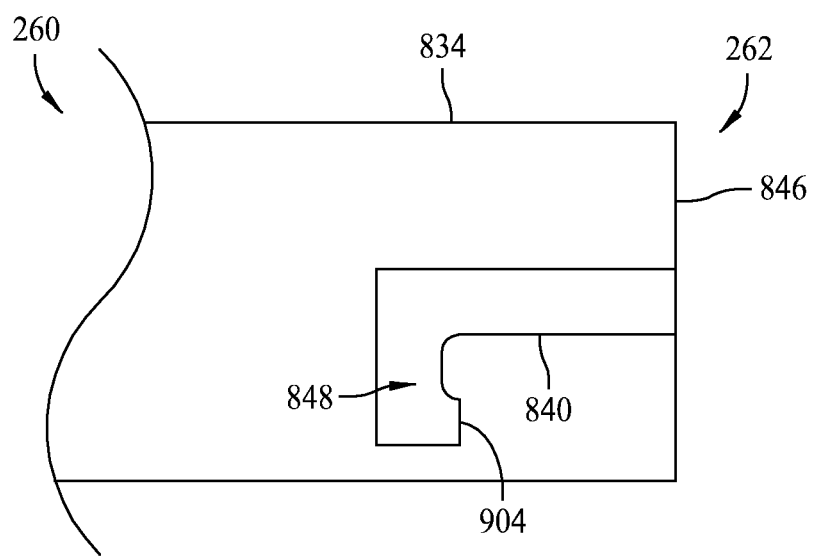
FIG. 20 is a cut-away side view of the outer center cooling fluid bayonet shown in FIG. 19.

FIG. 20 is a cut away side view of tip end 262 of outer center cooling fluid bayonet 834 (shown in FIG. 16). Longitudinal groove 840 extends a distance from tip end 262 of outer center cooling fluid bayonet 834, toward terminal end 260 of outer center cooling fluid bayonet 834, and transitions into a radial stop portion 848. Terminal end 260 of removable tip portion 810 is inserted into tip end 262 of outer center cooling fluid bayonet 834, and tabs 812 and 814 are inserted within grooves 840 and 842. As tip portion 810 is inserted within outer center cooling fluid bayonet 834, tabs 812 and 814 reach stop portion 848. When tip portion 810 is rotated, and after insertion and attachment of bayonet 836 to bayonet 834, tip portion 810 is releasably locked within outer center cooling fluid bayonet 834. To assemble injector feed assembly 800, a method similar to that used to assemble injector feed assembly 580 may be used. An optional locking portion 904 of stop portion 848 may be included to prevent rotation of tip portion 810 once tab 812 is positioned within locking portion 904.

The above described methods and apparatus facilitate the use of an injector assembly tip that includes both converging and diverging nozzles. The converging and diverging nozzles allow syngas production fluid streams to be injected into the gasification reactor at predetermined orientations, which increases syngas production efficiency. The above described methods and apparatus also facilitate assembly, disassembly, and maintenance of an injector assembly tip that includes both converging and diverging nozzles.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for assembling a gasification system injector assembly are described above in detail. The systems and methods illustrated are not limited to the specific embodiments described herein, but rather, components of the system may be utilized independently and separately from other components described herein. Further, steps described in the method may be utilized independently and separately from other steps described herein.

Exemplary embodiments of syngas production as associated with IGCC plants are described above in detail. The methods, apparatus and systems are not limited to the specific embodiments described herein nor to the specific illustrated IGCC plants.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling an annular injector that includes a plurality of substantially annular nozzles, said method comprising:
    providing a first bayonet assembly and a second bayonet assembly that each include a tip end and a terminal end, an outer diameter of the first bayonet assembly and an inner diameter of the second bayonet assembly vary at the tip end to define a first substantially annular nozzle therebetween;
    configuring the first bayonet assembly for positioning within the second bayonet assembly; and
    comprising configuring the second bayonet assembly to include an outer portion and a tip collar, the outer portion extending from the tip end of the second bayonet assembly to the terminal end of the second bayonet assembly, wherein configuring the first bayonet assembly for positioning within the second bayonet assembly comprises positioning the tip collar at least partially around the first bayonet assembly, the tip collar configured for slip-fit mating with the outer portion of second bayonet assembly to secure first bayonet assembly within second bayonet assembly.

2. A method according to claim 1 further comprising configuring a plurality of pins to secure the tip collar to the second bayonet assembly.

3. A method of assembling an annular injector that includes a plurality of substantially annular nozzles, said method comprising:
    providing a first bayonet assembly and a second bayonet assembly that each include a tip end and a terminal end, an outer diameter of the first bayonet assembly and an inner diameter of the second bayonet assembly vary at the tip end to define a first substantially annular nozzle therebetween;
    configuring the first bayonet assembly for positioning within the second bayonet assembly, wherein a maximum outer diameter of the first bayonet assembly is greater than a minimum inner diameter of the second bayonet assembly; and
    configuring the first bayonet assembly to include a removable tip, the removable tip including the maximum outer diameter of the first bayonet assembly, the removable tip facilitates inserting the tip end of the first bayonet assembly into the terminal end of the second bayonet assembly, inserting a terminal end of the removable tip into the tip end of the second bayonet assembly, and coupling the terminal end of the removable tip to the tip end of the first bayonet assembly.

4. A method according to claim 3 wherein configuring the first bayonet assembly to include a removable tip comprises at least one of:
    configuring a slip-fit juncture to secure the removable tip of the first bayonet assembly; and
    configuring at least one tab extending from the removable tip to fit within at least one slotted groove and stop within the first bayonet assembly, the at least one tab and the at least one slotted groove and stop configured to secure the removable tip of the first bayonet assembly.

5. An annular injector comprising:
    a first bayonet assembly comprising a terminal end and a tip end;
    a second bayonet assembly comprising a terminal end and a tip end, said second bayonet assembly configured to be concentrically coupled at least partially about said first bayonet assembly, wherein an outer diameter of said first bayonet assembly and an inner diameter of said second bayonet assembly vary at the tip end to define a first substantially annular nozzle therebetween; and
    a third bayonet assembly configured to be concentrically coupled at least partially about said second bayonet assembly to define a second substantially annular nozzle therebetween, wherein said second bayonet assembly comprises an outer section and a tip collar, said tip collar positioned at least partially around said first bayonet assembly and configured for slip-fit mating with said outer section of said second bayonet assembly, said tip collar configured to maintain a spacing between said first bayonet assembly and said second bayonet assembly.

6. An injector according to claim 5 wherein said tip collar comprises at least one strut positioned between an exterior surface of one of said assemblies and an interior surface of said at least one tip collar, said at least one strut configured to position said tip collar a distance from said assembly and provide a slip-fit between said bayonet assemblies.

7. An injector according to claim 5 further comprising at least one pin configured to secure said tip collar to said second bayonet assembly.

8. An injector according to claim 5 wherein said first and second bayonet assemblies, and said tip collar, are configured to define a substantially annular channel and said first substantially annular nozzle.

9. An annular injector comprising:
- a first bayonet assembly comprising a terminal end and a tip end;
- a second bayonet assembly comprising a terminal end and a tip end, said second bayonet assembly configured to be concentrically coupled at least partially about said first bayonet assembly, wherein an outer diameter of said first bayonet assembly and an inner diameter of said second bayonet assembly vary at the tip end to define a first substantially annular nozzle therebetween; and
- a third bayonet assembly configured to be concentrically coupled at least partially about said second bayonet assembly to define a second substantially annular nozzle therebetween;
- wherein said first bayonet assembly further comprises a removable tip portion, said removable tip portion removably coupled using at least one tab and at least one corresponding slotted groove and stop.

* * * * *